(12) United States Patent
Zinski et al.

(10) Patent No.: US 10,144,598 B2
(45) Date of Patent: Dec. 4, 2018

(54) VARIABLE FREQUENCY DRIVE COMBINED WITH FLOW LIMITER SET FOR LIMITING FLOW TO SELECTED LEVEL ABOVE DESIGN CHOICE

(71) Applicants: Novatec, Inc., Baltimore, MD (US); Stephen B. Maguire, West Chester, PA (US)

(72) Inventors: James Zinski, Ellicot City, MD (US); Stephen B. Maguire, West Chester, PA (US)

(73) Assignee: Novatec, Inc., Baltimore, MD (US)

( * ) Notice: Subject to any disclaimer, the term of this patent is extended or adjusted under 35 U.S.C. 154(b) by 0 days.

(21) Appl. No.: 15/182,934

(22) Filed: Jun. 15, 2016

(65) Prior Publication Data

US 2016/0297625 A1 Oct. 13, 2016

Related U.S. Application Data

(63) Continuation-in-part of application No. 15/064,995, filed on Mar. 9, 2016, and a continuation-in-part of
(Continued)

(51) Int. Cl.
*B65G 53/66* (2006.01)
*B65G 53/26* (2006.01)
(Continued)

(52) U.S. Cl.
CPC .......... *B65G 53/66* (2013.01); *B29C 47/1009* (2013.01); *B29C 47/92* (2013.01); *B65G 53/26* (2013.01); *B29C 47/0078* (2013.01); *B29C 2791/006* (2013.01); *B29C 2947/926* (2013.01); *B29C 2947/92019* (2013.01); *B29C 2947/92104* (2013.01); *B29C 2947/92333* (2013.01); *B29C 2947/92828* (2013.01);
(Continued)

(58) Field of Classification Search
CPC ........ B65G 53/58; B65G 53/26; B65G 53/34; B65G 53/66; B29C 47/1027
USPC .................... 406/14, 46, 122, 151, 156, 157
See application file for complete search history.

(56) References Cited

U.S. PATENT DOCUMENTS 1,001,510 A 8/1911 Curbey
1,418,096 A 5/1922 Royer
(Continued)

FOREIGN PATENT DOCUMENTS

CN 202302166 U 7/2012
DE 3541532 A1 5/1986
(Continued)

OTHER PUBLICATIONS

Sheet of 2 photographs of Mould-Tek gravimetric blender, circa 1993.
(Continued)

*Primary Examiner* — Joseph A Dillon, Jr.
(74) *Attorney, Agent, or Firm* — Fox Rothschild LLP

(57) ABSTRACT

Apparatus has a vacuum pump for conveying granular plastic resin material from a supply to receivers retaining and dispensing resin when needed by a process machine with a flow limiter connected to the suction head of the vacuum pump, with the vacuum pump being a controlled, variable speed device.

28 Claims, 9 Drawing Sheets

Related U.S. Application Data application No. 15/066,157, filed on Mar. 10, 2016, now Pat. No. 9,937,651, and a continuation-in-part of application No. 14/804,404, filed on Jul. 21, 2015, and a continuation-in-part of application No. 14/602,784, filed on Jan. 22, 2015, now Pat. No. 9,550,636, and a continuation-in-part of application No. 14/593,010, filed on Jan. 9, 2015, now Pat. No. 9,550,635, and a continuation-in-part of application No. 14/574,561, filed on Dec. 18, 2014, now Pat. No. 9,604,793, and a continuation-in-part of application No. 14/185,016, filed on Feb. 20, 2014, now Pat. No. 9,371,198.

(60) Provisional application No. 62/297,240, filed on Feb. 19, 2016.

(51) Int. Cl.
*B29C 47/10* (2006.01)
*B29C 47/92* (2006.01)
*B29K 105/00* (2006.01)
*B29C 47/00* (2006.01)

(52) U.S. Cl.
CPC .. *B29K 2105/251* (2013.01); *B65G 2201/042* (2013.01); *Y02P 70/26* (2015.11); *Y02P 70/30* (2015.11)

(56) References Cited

U.S. PATENT DOCUMENTS

| | | |
|---|---|---|
| 1,579,251 A | 4/1926 | Schossow |
| 2,116,912 A | 5/1938 | Richardson |
| 2,161,190 A | 6/1939 | Paull |
| 2,351,035 A | 6/1944 | Grant, Jr. |
| 2,403,689 A | 7/1946 | Sprague |
| 2,601,654 A | 6/1952 | Wright |
| 2,655,934 A | 10/1953 | Charles |
| 2,718,435 A | 9/1955 | Hudspeth |
| 2,765,812 A | 10/1956 | Werner |
| 2,917,077 A | 12/1959 | Ziege |
| 3,111,115 A | 11/1963 | Best |
| 3,115,276 A | 12/1963 | Johanningmeier |
| 3,122,162 A | 2/1964 | Sands |
| 3,151,628 A | 10/1964 | Heckert |
| 3,164,141 A | 1/1965 | Jones |
| 3,209,898 A | 10/1965 | Beebe et al. |
| 3,239,278 A | 3/1966 | Mueller |
| 3,348,848 A | 10/1967 | Lucking et al. |
| 3,367,362 A | 2/1968 | Hoffman |
| 3,381,708 A | 5/1968 | Chenoweth |
| 3,434,493 A | 3/1969 | Owens |
| 3,468,338 A | 9/1969 | Patterson |
| 3,470,994 A | 10/1969 | Schnell et al. |
| 3,621,873 A | 11/1971 | Kenann |
| 3,667,087 A | 6/1972 | Dakin |
| 3,735,777 A | 5/1973 | Katzer et al. |
| 3,773,300 A | 11/1973 | Hauser |
| 3,794,077 A | 2/1974 | Fanshier |
| 3,861,830 A | 1/1975 | Johnson |
| 3,872,884 A | 3/1975 | Busdiecker |
| 3,931,953 A | 1/1976 | Allen |
| 3,951,461 A | 4/1976 | De Feudis |
| 3,959,636 A | 5/1976 | Johnson et al. |
| 3,985,262 A | 10/1976 | Nauta |
| 4,005,908 A | 2/1977 | Freeman |
| 4,026,442 A | 5/1977 | Orton |
| 4,108,334 A | 8/1978 | Moller |
| 4,148,100 A | 4/1979 | Moller |
| 4,174,731 A | 11/1979 | Sturgis |
| 4,183,467 A | 1/1980 | Sheraton |
| 4,219,136 A | 8/1980 | Williams et al. |
| 4,221,510 A | 9/1980 | Smith |
| 4,262,878 A | 4/1981 | O'ffill |
| 4,269,223 A | 5/1981 | Carter et al. |
| 4,284,261 A | 8/1981 | Benjamin |
| 4,294,020 A | 10/1981 | Evans |
| 4,342,443 A | 8/1982 | Wakeman |
| 4,354,622 A | 10/1982 | Wood |
| 4,373,838 A | 2/1983 | Foreman |
| 4,402,436 A | 9/1983 | Hellgren |
| 4,402,635 A | 9/1983 | Maruo |
| 4,454,943 A | 6/1984 | Moller |
| 4,475,672 A | 10/1984 | Whitehead |
| 4,498,783 A | 2/1985 | Rudolph |
| 4,501,518 A | 2/1985 | Smith |
| 4,508,091 A | 4/1985 | Wakeman |
| 4,511,291 A * | 4/1985 | Quates, Sr. ............ B65G 53/14 406/128 |
| 4,525,071 A | 6/1985 | Horowitz et al. |
| 4,581,704 A | 4/1986 | Mitsukawa |
| 4,586,854 A | 5/1986 | Newman |
| 4,705,083 A | 11/1987 | Rossetti |
| 4,756,348 A | 7/1988 | Moller |
| 4,793,711 A | 12/1988 | Ohlson |
| 4,812,086 A * | 3/1989 | Kopernicky ........... B65G 53/60 406/106 |
| 4,830,508 A | 5/1989 | Higuchi et al. |
| 4,834,385 A | 5/1989 | Jackson |
| 4,842,198 A | 6/1989 | Chang |
| 4,848,534 A | 7/1989 | Sandwall |
| 4,850,703 A | 7/1989 | Hanaoka et al. |
| 4,962,831 A | 10/1990 | Dundas |
| 4,995,422 A | 2/1991 | Chew |
| 5,011,043 A | 4/1991 | Whigham |
| 5,054,965 A | 10/1991 | Clark |
| 5,110,521 A | 5/1992 | Moller |
| 5,116,547 A | 5/1992 | Tsukahara et al. |
| 5,132,897 A | 7/1992 | Allenberg |
| 5,143,166 A | 9/1992 | Hough |
| 5,147,152 A | 9/1992 | Link |
| 5,148,943 A | 9/1992 | Moller |
| 5,172,489 A | 12/1992 | Moller |
| 5,225,210 A | 7/1993 | Shimoda |
| 5,232,314 A | 8/1993 | Hopkins |
| 5,244,179 A | 9/1993 | Wilson |
| 5,252,008 A | 10/1993 | May, III et al. |
| 5,261,743 A | 11/1993 | Moller |
| 5,285,930 A | 2/1994 | Nielsen |
| 5,340,949 A | 8/1994 | Fujimura et al. |
| 5,341,961 A | 8/1994 | Hausam |
| 5,378,089 A * | 1/1995 | Law ..................... B01J 4/00 406/123 |
| 5,415,321 A | 5/1995 | Gehlert |
| 5,423,455 A | 6/1995 | Ricciardi et al. |
| 5,575,309 A | 11/1996 | Connell |
| 5,575,596 A | 11/1996 | Bauer |
| 5,613,516 A | 3/1997 | Landrum |
| 5,651,401 A | 7/1997 | Cados |
| 5,669,265 A | 9/1997 | Adler |
| 5,704,391 A | 1/1998 | McGowan et al. |
| 5,767,453 A | 6/1998 | Wakou et al. |
| 5,767,455 A | 6/1998 | Mosher |
| 5,780,779 A | 7/1998 | Kitamura et al. |
| 5,791,830 A | 8/1998 | Fort |
| 5,794,789 A | 8/1998 | Payson |
| 5,843,513 A | 12/1998 | Wilke et al. |
| 6,007,236 A | 12/1999 | Maguire |
| 6,036,407 A | 3/2000 | Nester |
| 6,076,803 A | 6/2000 | Johnson |
| 6,085,777 A | 7/2000 | Welker |
| 6,089,794 A | 7/2000 | Maguire |
| 6,102,629 A | 8/2000 | Ishida |
| 6,152,656 A | 11/2000 | Curtis et al. |
| 6,158,363 A | 12/2000 | Memory et al. |
| 6,199,583 B1 | 3/2001 | Iacovella |
| 6,227,768 B1 | 5/2001 | Higuchi |
| 6,379,086 B1 | 4/2002 | Goth |
| 6,386,800 B1 | 5/2002 | van Eyck |
| 6,413,020 B1 | 7/2002 | Davison |
| 6,419,418 B1 | 7/2002 | Smith |
| 6,447,215 B1 * | 9/2002 | Wellmar ................ B65G 53/66 406/11 |

(56) References Cited

U.S. PATENT DOCUMENTS

| | | |
|---|---|---|
| 6,497,083 B1 | 12/2002 | Garwood |
| 6,585,004 B1 | 7/2003 | Porter |
| 6,588,988 B2 | 7/2003 | Zlotos |
| 6,634,375 B2 | 10/2003 | Olivas |
| 6,644,345 B2 | 11/2003 | Dulin |
| 6,648,558 B1 | 11/2003 | Shultz |
| 6,786,681 B2 | 9/2004 | Grasshoff |
| 6,834,755 B2 | 12/2004 | Jay |
| 6,871,618 B2 | 3/2005 | Masse |
| 6,890,129 B2 | 5/2005 | Fabbri |
| 6,923,601 B2 | 8/2005 | Goth |
| 6,942,133 B2 | 9/2005 | Frankeberger |
| 6,981,619 B2 | 1/2006 | Moretto |
| 7,066,689 B2 | 6/2006 | Maguire |
| 7,080,960 B2 | 7/2006 | Burnett |
| 7,114,889 B2 | 10/2006 | Kanou |
| 7,117,886 B2 | 10/2006 | Kajitani |
| 7,137,729 B2 | 11/2006 | Moretto |
| 7,188,434 B2 | 3/2007 | Moretto |
| 7,191,807 B2 | 3/2007 | DeMaison |
| 7,192,222 B2 | 3/2007 | Van Mullekom |
| 7,231,927 B2 | 6/2007 | Suehara |
| 7,311,474 B1 | 12/2007 | Ogasahara |
| 7,318,459 B2 | 1/2008 | Frankeberger |
| 7,384,018 B2 | 6/2008 | Moretto |
| 7,472,494 B2 | 1/2009 | Moretto |
| 7,503,128 B2 | 3/2009 | Moretto |
| 7,662,211 B2 | 2/2010 | Federico |
| 7,766,037 B2 | 8/2010 | Moenkhaus |
| 7,766,305 B2 | 8/2010 | Kim |
| 8,021,462 B2 | 9/2011 | Moretto |
| D650,888 S | 12/2011 | Moretto |
| 8,070,844 B2 | 12/2011 | Maguire |
| 8,092,070 B2 | 1/2012 | Maguire |
| 8,113,745 B2 * | 2/2012 | Aoki ............... B65G 53/525 406/126 |
| D671,563 S | 11/2012 | Moretto |
| D671,564 S | 11/2012 | Moretto |
| 8,322,951 B2 | 12/2012 | Kvalheim |
| 8,360,691 B2 * | 1/2013 | Moretto ............. B65G 53/66 406/122 |
| 8,412,383 B2 | 2/2013 | Moretto |
| 8,408,228 B1 | 4/2013 | Jimenez |
| D688,711 S | 8/2013 | Moretto |
| 8,672,194 B2 | 3/2014 | Moretto |
| 8,753,432 B2 | 6/2014 | Maguire |
| 8,763,273 B2 | 7/2014 | Moretto |
| 8,793,900 B2 | 8/2014 | Moretto |
| D718,791 S | 12/2014 | Moretto |
| 8,905,681 B2 | 12/2014 | Schneider |
| 8,914,990 B2 | 12/2014 | Moretto |
| 9,181,044 B1 | 11/2015 | Baker |
| 9,365,367 B2 | 6/2016 | Kraemer |
| 9,371,198 B2 | 6/2016 | Maguire |
| 9,459,183 B1 | 10/2016 | Schnakenberg |
| 9,550,635 B2 | 1/2017 | Maguire |
| 9,550,636 B2 | 1/2017 | Maguire |
| 9,604,793 B2 | 3/2017 | Maguire |
| 9,637,320 B2 | 5/2017 | Moretto |
| 9,663,263 B2 | 5/2017 | Moretto |
| 2002/0061232 A1 | 5/2002 | Zlotos |
| 2002/0136609 A1 | 9/2002 | Maguire |
| 2003/0168618 A1 | 9/2003 | Coney |
| 2004/0115013 A1 | 6/2004 | Goth |
| 2004/0221893 A1 | 11/2004 | Johnson |
| 2005/0012058 A1 | 1/2005 | Medina |
| 2005/0039816 A1 | 2/2005 | Maguire |
| 2005/0089378 A1 | 4/2005 | Gerber |
| 2005/0265793 A1 | 12/2005 | Van Mullekom |
| 2008/0314461 A1 | 12/2008 | Moretto |
| 2009/0031580 A1 | 2/2009 | Moretto |
| 2009/0039106 A1 | 2/2009 | Moretto |
| 2009/0090018 A1 | 4/2009 | Moretto |
| 2009/0151800 A1 | 6/2009 | Salmento |
| 2009/0295016 A1 | 12/2009 | Shinohara |
| 2011/0211919 A1 | 9/2011 | Rasner |
| 2011/0299943 A1 | 12/2011 | Woolever |
| 2012/0201917 A1 | 8/2012 | Shinohara |
| 2013/0202370 A1 | 8/2013 | Moretto |
| 2013/0209180 A1 | 8/2013 | Moretto |
| 2015/0175282 A1 | 6/2015 | Thompson |
| 2015/0232287 A1 | 8/2015 | Maguire |
| 2015/0232289 A1 | 8/2015 | Maguire |
| 2015/0232290 A1 | 8/2015 | Maguire |
| 2015/0308584 A1 | 10/2015 | Ehrne |
| 2015/0321860 A1 | 11/2015 | Maguire |
| 2016/0096693 A1 | 4/2016 | Hanaoka |
| 2016/0158967 A1 | 6/2016 | Maguire |
| 2016/0167897 A1 | 6/2016 | Wiemers |
| 2016/0244275 A1 | 8/2016 | Maguire |
| 2016/0272439 A1 | 9/2016 | Kelly |
| 2016/0280473 A1 | 9/2016 | Veselov |
| 2016/0292953 A1 | 10/2016 | Brown |
| 2016/0347557 A1 | 12/2016 | Tell |
| 2017/0174447 A1 | 6/2017 | Baker |

FOREIGN PATENT DOCUMENTS

| | | |
|---|---|---|
| DE | 3923241 | 1/1991 |
| DE | 4323295 | 2/1995 |
| EP | 0318170 | 5/1989 |
| EP | 0507689 | 10/1992 |
| EP | 0587085 | 9/1994 |
| EP | 0743149 | 11/1996 |
| FR | 2109840 | 5/1972 |
| FR | 2235775 | 1/1975 |
| FR | 2517087 | 5/1983 |
| GB | 203758 A | 9/1923 |
| GB | 271930 A | 6/1927 |
| GB | 2081687 | 2/1982 |
| JP | 1235604 | 9/1989 |
| JP | 4201522 | 7/1992 |
| JP | 6114834 | 4/1994 |

OTHER PUBLICATIONS

Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" by Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circla 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.

(56) References Cited

OTHER PUBLICATIONS

One page two-sided flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders: published by Maguire Products, Inc., 1995".
Five page brochure entitled "Blending power: GXB Blender The Better Alternative" of Mould-Tek, circa 1998.
Forty-four page two-sided brochure including cover and back pages entitled "Maguire: Auxiliary equipment for the plastics industry" of Maguire Products, Inc., Oct. 2000.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Two page two-sided color brochure entitled "Model GXB-2202 Exac-U-Batch Gravimetric Scale Blender: Accurate weigh scale blending under precise computer control" of Mould-tek, 2000.
One page, two-sided color brochure entitled "Bulk handling power: the manufacturer of the world's most advanced blender gives you the same performance in bulk handling systems" of Mould-Tek, dated Apr. 1999.
Three page two-sided color brochure entitled "Portable Drying and Conveying Systems: Nomad™ Series Portable Dryers", AEC Whitlock, 1998.
Two page two-sided color brochure entitled "Drying Systems: WD Series Dehumidifying Dryers" of AEC Whitlock, 1997.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu™ Loading System" of Maguire Products, Inc.
Four page two-sided color brochure entitled "Novatec Inc. Vacuum Loaders—Electro-Polished Stainless Steel Finish" of Novatec Inc., undated.
Eight page two-sided color brochure entitled "Novatec Inc. Material Conveying Solutions for the Plastics Industry", 1999.
Two page two-sided color brochure entitled Maguire Model MPM Pre-Mixers of Maguire Products, Inc., Apr. 1997.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Five page two-sided color brochure entitled "AEC Auxiliaries As Primary", AEC, Inc., 1999.

\* cited by examiner

VARIABLE FREQUENCY DRIVE COMBINED WITH FLOW LIMITER SET FOR LIMITING FLOW TO SELECTED LEVEL ABOVE DESIGN CHOICE

CROSS REFERENCE TO RELATED PATENT APPLICATIONS

This patent application claims the benefit of the priority of U.S. provisional patent application Ser. No. 62/297,240 filed 19 Feb. 2016. The priority is claimed under 35 USC 119 and 35 USC 120.

This patent application is a 35 USC 120 continuation-in-part of co-pending U.S. patent application Ser. No. 14/185,016 filed 20 Feb. 2014 in the name of Stephen B. Maguire and entitled "Air Flow Regulator," published 20 Aug. 2015 as U.S. patent publication 2015/0232287 A1; the priority of which is claimed under 35 USC 120.

This patent application is also a 35 USC 120 continuation-in-part of co-pending U.S. patent application Ser. No. 14/574,561 filed 18 Dec. 2014 in the name of Stephen B. Maguire and entitled "Resin Delivery System With Air Flow Regulator," published 20 Aug. 2015 as U.S. patent publication 2015/0231801 A1; the priority of which is claimed under 35 USC 120.

This patent application is yet also a 35 USC 120 continuation-in-part of co-pending U.S. patent application Ser. No. 14/593,010 filed 9 Jan. 2015 in the name of Stephen B. Maguire and entitled "Air Flow Limiter with Closed/Open Sensing," published 20 Aug. 2015 as U.S. patent publication 2015/0232289 A1; the priority of which is claimed under 35 USC 120.

This patent application is still further a 35 USC 120 continuation-in-part of co-pending U.S. patent application Ser. No. 14/602,784 filed 22 Jan. 2015 in the name of Stephen B. Maguire and entitled "Method and Apparatus For Resin Delivery With Adjustable Air Flow Limiter," published 20 Aug. 2015 as U.S. patent publication 2015/0232290 A1; the priority of which is claimed under 35 USC 120.

This patent application is yet still further a 35 USC 120 continuation-in-part of co-pending U.S. patent application Ser. No. 14/804,404 filed 21 Jul. 2015 in the name of Stephen B. Maguire and entitled "Vacuum Powered Resin Loading System Without Central Control," published 12 Nov. 2015 as U.S. patent publication 2015/0321806 A1; the priority of which is claimed under 35 USC 120.

This patent application is also a 35 USC 120 continuation-in-part of co-pending U.S. patent application Ser. No. 15/064,995 filed 14 Mar. 2016 in the names of James Zinski and Stephen B. Maguire and entitled "Resin Delivery Method and Apparatus Using Multiple Sensors for Optimal Vacuum Pump Operation."

This patent application is also a 35 USC 120 continuation-in-part of co-pending U.S. patent application Ser. No. 15/066,157 filed 10 Mar. 2016 in the names of James Zinski and Stephen B. Maguire and entitled "Resin Delivery Apparatus and Method with Plural Air Flow Limiters."

STATEMENT REGARDING FEDERALLY SPONSORED RESEARCH OR DEVELOPMENT

Not applicable—this invention was conceived and developed entirely using private source funding; this patent application is being filed and paid for entirely by private source funding.

BACKGROUND OF THE INVENTION

This invention relates to manufacture of plastic articles and more particularly relates to pneumatic conveyance and processing of plastic resin pellets prior to molding or extrusion of those pellets into a finished or semi-finished plastic product.

In this patent application, injection and compression molding presses and extruders are collectively referred to as "process machines."

The Technology

The plastics industry is very diversified; there are thousands of different products, hundreds of materials, and dozens of processes, and all are very different from one another. The only thing all these differences share in common is that the source material is some type of plastic.

Equipment sold to this industry is, therefore, very diverse in design. Plastics factories have multiple process machines, sometimes several hundred in one location. Virtually all plastics fabricating operations require that each process machine, namely a molding press or an extruder, be supplied automatically with the required raw resin material on a continuous basis. This resin may be supplied in large boxes, called Gaylords, in fiber drums, in 50 pound bags, or more typically may be delivered by bulk truck or rail car, with the resin material then being transferred in bulk into storage silos. In all cases the resin material must be further distributed throughout the plant to each and every process machine. For that reason a great deal of design and capital expense is devoted to the automatic distribution of the raw resin material throughout the plant.

These resin distribution systems, more commonly referred to as "Loading Systems", must deal with many variables. One set of variables includes the type, shape, size and consistency of the granular material.

Resin pellets, nominally about ⅛ inch in size, come in various shapes, with round, square, and cylindrical being the most common.

Flowing resin powder is also an option, and very fine but free flowing resin pellets and other granular materials may be conveyed as well, The design variables to be considered for each customer include:
1. Type of resin being conveyed.
2. Size and consistency of the resin pellets.
3. Distances the resin pellets are to be conveyed.
4. Variability of these distances from shortest to longest.
5. Acceptable range for velocity of resin material travel through the lines.
6. Throughput rate of resin required for each machine.
7. Total throughput rate of resin for the entire plant.
8. Excess capacity performance margin so a molding or extrusion process is not interrupted by short term loading issues.
9. Loss of resin material from or at the supply so that only air is being pulled, thereby reducing system vacuum levels and reducing overall design throughput.
10. Loading sequence, or priority, when multiple receiver stations call for material.
11. Detecting problems and alarm conditions.
12. Proper air to material ratio for resin conveying.
13. Detecting plugged lines due to poor resin flow or over feeding of resin material.
14. Dust condition and filter requirements.
15. Reliability.

16. Serviceability.
17. Ease of use.
18. Cost
19. Vacuum pump type, namely positive displacement, regenerative, and others.
20. Vacuum pump horsepower and rated CFM capacity as well as vacuum levels.

In all of these areas, system designers look to find improved methods and solutions whenever possible.

One of the most important considerations is to hold a correct velocity for the conveyed resin material. The type of resin material dictates the target conveying speed. To maximize the resin material transfer rate, a high conveying speed is preferred, and air speed in any case must be sufficient to keep the resin pellets suspended and moving in the air stream. But velocity must be limited so as not to damage the pellets. Hard, brittle pellets can fracture and break when conveyed, resulting in excessive dust.

Softer pellets can skid along the conduit walls, causing "angel hair" as a result of the plastic resin melting at the point of high speed contact with the conduit wall; this leaves a thin film on the wall. Strings of very thin "angel hair" accumulate, effectively reducing diameter of the conduit and causing problems in the system.

Air speed and resin conveying velocity are directly related to pump capacity (rated Cubic Feet per Minute, abbreviated as "CFM") and horsepower, as well as conveying line diameter. There is always a correct velocity "range" for each type of resin material. It is a design challenge to assure that resin material is conveyed within the correct velocity range.

Conveying distances affect system design. Conveying over short distances requires a less powerful vacuum source then over longer distances. Systems are generally sized to produce the best compromise for material velocity between the shortest and longest conveying distance.

Required conveying rate usually dictates line size (tube diameter), and this in turn dictates the CFM required to maintain correct velocity in a given diameter conduit. This means different tube sizes in the same system can be a problem if one vacuum pump is to draw air and resin through several different diameter conveying lines. Pumps have known CFM ratings. Pulling air through a small tube will result in higher velocity flow than pulling the same CFM through a larger tube.

Excessive velocity can damage pellets.

The type of vacuum pump selected is important. Regenerative blowers deliver wide ranging CFM depending on vacuum level. Positive displacement type pumps deliver high vacuum levels, and have a flatter CFM curve over their vacuum range. Regenerative blowers are quieter and generally cost less. Positive displacement blowers may require sound enclosures and tend to cost more, but are generally more reliable and more forgiving as respecting dust in the air.

The simplest systems use a fixed speed motor to drive the vacuum pump, and a single size conveying line to serve all receivers regardless of distance, rate requirement, or material.

VFD (Variable Frequency Drive) motors allow vacuum pumps to operate at different speeds, and therefore at different CFM rates, with the vacuum pump pulling different vacuum levels depending on preset information about each receiver being served, and/or making adjustments based on real time feedback of vacuum sensors located at various places in the system.

The addition of a SCFM (Standard Cubic Feet per Minute) limiter in the air flow line allows oversized vacuum pumps to be used without risk of conveying at excessive velocity. SCFM limiters restrict air flow to a preset SCFM. This maintains the desired SCFM air flow at the inlet, which is critical for proper conveying for a given size conveying line. This concept is the subject of co-pending parent U.S. patent application Ser. No. 14/185,016, published 20 Aug. 2015 as U.S. patent publication 2015/0232287 A1.

Reading vacuum levels at various points tells the controlling processor if the line is open, which means only air and no material is present and air is flowing unrestrictedly. This signals a loss of material at the source. A high vacuum reading indicates a plugged or nearly plugged line. Normal conditions are present where material is flowing correctly at detected mid-vacuum levels.

One line size for all receivers assures the resin transport velocity is more likely to be in the acceptable range. However, most processes require the base resin material be delivered at 50 times the rate of additives, such as color concentrate. Virgin (or natural) pellets may have to be loaded at a rate of 1000 pounds per hour, requiring a 2.5 or 3 inch line size, while color is only required to be delivered at a rate of 20 to 40 pounds an hour. A smaller receiver is used for color, namely a receiver one that loads perhaps 5 pounds at a time, while the receiver for the virgin resin material will be larger, perhaps loading 50 pounds of each load cycle. A 2.5 inch line on a 5 pound receiver would be too large. 1.5 inch line would be standard, and the use of 1.5 inch resin conveying line would be better. But this risks velocities that are excessive. This results in trade-offs in design.

Description of the Prior Art

Current resin central loading systems concerned with conveying granular plastic resin pellets from a storage area for molding or extrusion typically include a vacuum pump or pumps and multiple receivers.

In some systems, with many receivers, several small pumps are used.

It would be less expensive to use only one, or fewer, larger pumps. However, a larger pump may draw too much air with resulting damage to the material being conveyed. While a larger pump could load several receivers at once, there is a risk that an "open" line, namely a line pulling only air, and no resin material, would cause the vacuum to drop too much, and no resin would load. Also, when only one receiver is loading resin, air velocity might be too high, again with a risk of damaging the resin.

Nevertheless, in facilities that fabricate plastic products by molding or extrusion, it is common to use such vacuum loading systems to pneumatically convey pellets of thermoplastic resin, prior to molding or extrusion of those pellets into a finished or semi-finished product. The plastic resin pellets are typically purchased in 50 pound bags, 200 pound drums, or 1,000 pound containers commonly referred to as "Gaylords."

A common approach for conveying plastic resin pellets from a storage location to a process machine, which approach is often used in larger facilities, is to install a central vacuum pump or even several vacuum pumps, connected by common vacuum lines to multiple "receivers."

Vacuum pumps connected to the vacuum lines draw vacuum, namely air at pressure slightly below atmospheric, as the vacuum pump sucks air through the "vacuum" line. The suction moves large quantities of air which carries thermoplastic resin pellets through the "vacuum" line.

An alternative is to use positive pressure produced by a blower or the exhaust side of a vacuum pump. With such an approach, the positive pressure results in a movement of substantial amounts of air which may be used to carry the plastic resin pellets. However, the vacuum approach of drawing or sucking or pulling pellets through the system conduit(s) is preferable to the positive pressure approach of pushing the resin pellets through the system conduit(s).

In practice, vacuum pumps are preferred and vacuum lines are desirable in part because power requirements to create the required vacuum necessary to draw plastic resin pellets through the lines are lower than the power requirements if the plastic resin pellets are pushed through the lines by a blower or by the exhaust side of a vacuum pump. When vacuum is used, the static pressure within the line may be not much less than atmospheric. When positive pressure is used, the dynamic pressure of the air flowing through the line must be relatively high in order to move an adequate quantity of plastic resin pellets.

As used herein, and in light of the foregoing explanation, the terms "vacuum pump" and "blower" are used interchangeably.

When one or more central vacuum pumps are connected to multiple receivers, each receiver is typically located over an individual temporary storage hopper, in which the plastic resin pellets are temporarily stored before being molded or extruded. Each temporary storage hopper is typically associated with a separate process machine.

In current practice, the receiver is connected by a control wire to a central control system. The control system works by selectively opening a vacuum valve located in each receiver, allowing one or several vacuum pumps to work in sequence drawing "vacuum", i.e. below atmospheric pressure air, to carry the pellets among and to multiple receivers as individual ones of the receivers, positioned over individual hoppers associated with the individual process machines, require additional plastic resin pellets. The receiver for a given hopper-process machine combination is typically actuated by opening a vacuum valve located in or near the receiver, causing the receiver to supply plastic resin pellets by gravity feed into the hopper from where the pellets may be fed further by gravity downwardly into the associated process machine.

Large, high capacity industrial vacuum pumps are reliable and are suited to heavy duty industrial use. These large, high capacity vacuum pumps allow long conveying distances for the plastic resin pellets. Currently available large capacity vacuum pumps permit plastic resin pellets to be conveyed over distances of 200 feet or more using vacuum drawn by the pump. Use of such high capacity vacuum pumps results in a big rush of below atmospheric pressure air through the line, carrying the plastic resin pellets over a long distance. The vacuum pump speed is not modulated; the vacuum pump is either "on" or "off." As a result, when the pump is operating, "vacuum", more accurately "air", is drawn at a fixed rate by the vacuum pump through the system.

Operators of plastic manufacturing facilities prefer to buy plastic resin pellets in bulk, in rail cars or tanker trucks. Bulk purchases result in cost savings. Plastic resin pellets delivered in bulk are typically pumped into large silos for storage. In a large manufacturing facility, the distance from a plastic resin pellet storage silo to a process machine may be several hundred feet, or more. Accordingly, when plastic resin pellets are purchased in bulk, a central vacuum-powered conveying system, powered by one or more large, high capacity industrial vacuum pumps, is a necessity.

Typically, large central plastic resin pellet conveying systems have one or more vacuum pumps, each typically being from 5 to 20 horsepower. These central systems include central controls connected by wire to each receiver associated with each process machine in the facility. Typically eight, sixteen, thirty-two or sixty-four receivers, each associated with a process machine, may be connected to and served by the central plastic resin pellet vacuum conveying system. Of course, the higher the number of receivers served by the system, the higher the cost. The central control is connected by wire to each receiver and is used to signal when a receiver is empty and therefore needs and should receive granular resin material. The central control, wired to each receiver, does not measure vacuum level at the receiver and is not in any way used to moderate or modulate operation of the vacuum pump.

A factor to be considered in designing such a system is the speed of the plastic resin pellets as they flow through a conduit as the plastic resin pellets are carried by the moving air stream drawn by the vacuum pump. If air flow is too slow, the plastic resin pellets fall out of the air stream and lie on the bottom of the conduit, with resulting risk of clogging the conduit. If air flow is too fast, the plastic resin pellets can skid along the conduit surface. In such case, harder, more brittle plastic resin pellets may be damaged, resulting in dust within the conduit, which when drawn into the vacuum pump can damage the vacuum pump and render the system inoperative. Softer plastic resin pellets heat up and can melt from friction when contacting the conduit interior surface. This results in the aforementioned "angel hair"—long, wispy-thin strands of plastic film which eventually clog the conduit and cause the system to shut down.

For these reasons, pneumatic plastic resin pellet conveying systems must be designed to produce desired, reasonable conveying speeds for the plastic resin pellets.

Currently, conveying speed of the plastic resin pellets is most often controlled by controlling air flow, measured in cubic feet per minute, and varying the desired and designed cubic feet per minute based on conduit diameter, with a larger diameter conduit requiring more cubic feet per minute of air flow to maintain proper air flow speed through the conduit. Controlling air flow, measured in cubic feet per minute, is conventionally done by specifying the vacuum pump capacity; vacuum pump speed modulation is not within the state of the art.

Controlling cubic feet per minute of air flow is an indirect way of controlling plastic resin pellet speed as the plastic resin pellets flow through a conduit of a given diameter. Typically, a 2 inch diameter conduit requires about 60 cubic feet per minute of air flow to convey typical plastic resin pellets. A 2½ inch diameter conduit typically requires about 100 cubic feet per minute of air flow to convey typical plastic resin pellets. To achieve these desired air flow volume flow rates, a designer must carefully match the horsepower of a vacuum pump, which has a given cubic feet of air per minute rating, to a selected size conduit, taking into consideration the average distance the plastic resin pellets must be conveyed through the conduit from a storage silo to a receiver or loader (because resin conveyance systems are not designed for modulation of vacuum pump speed, for the reason noted above—vacuum pump speed modulation is not within the state of the art). If this results in selection of a 5 horsepower blower/vacuum pump, then a given facility may require several such blowers/vacuum pumps, with each blower/vacuum pump supplying only a selected number of receivers.

A single plastic resin molding or extruding facility might theoretically require a 20 horsepower blower and the corresponding cubic feet per minute capability for resin conveyance provided by the single blower to meet the total resin conveying requirements for plastic resin pellets throughout the facility. However, a single twenty horsepower blower would result in far too high a conveying speed for the plastic resin pellets through any reasonable size conduit. As a result, the conveying system for the plastic resin pellets in a large facility is necessarily divided and powered by three or four smaller blowers, resulting in three or four different, separate systems for conveyance of plastic resin pellets. Sometimes several blowers are connected to a single set of receivers, with one or more of the extra blowers turning "on" only when required to furnish the required extra cubic feet per minute of air flow. This is controlled by a central station monitoring all receivers and all blowers, with the central station being programmed to maintain all of the hoppers associated with the process machines in a full condition, wherever those hoppers are located throughout the facility.

Even with careful planning and design, results achieved by such pneumatic plastic resin pellet conveying systems are not consistent. Air flow speed and cubic feet per minute capacity of blowers often vary and are outside of selected design and specification values.

INCORPORATION BY REFERENCE

This patent application incorporates by reference the disclosure of pending U.S. patent application Ser. No. 14/185,016, published 20 Aug. 2015 as U.S. patent publication 2015/0232287 A1; and pending U.S. patent application Ser. No. 14,574,561, published 20 Aug. 2015 as U.S. patent publication 2015/0231801 A1; and pending U.S. patent application Ser. No. 14,593,010, published 20 Aug. 2015 as U.S. patent publication 2015/0232289 A1; and pending U.S. patent application Ser. No. 14,602,784, published 20 Aug. 2015 as U.S. patent publication 2015/0232290 A1, and pending U.S. patent application Ser. No. 14/804,404, published 12 Nov. 2015 as U.S. patent publication 2015/0321860.

The disclosure of U.S. Pat. No. 8,753,432 is also incorporated herein by reference.

SUMMARY OF THE INVENTION

The instant invention provides an improvement to known pneumatic plastic resin pellet conveying systems, reducing the costs of those systems while providing consistent control of delivered cubic feet per minute of air for individual receivers. The invention facilitates easy expansion of the pneumatic plastic resin pellet conveying system as needs grow.

Air flow control devices, desirably of the type disclosed herein and of the type disclosed in co-pending parent U.S. patent application Ser. No. 14/185,016, filed 20 Feb. 2014, published 20 Aug. 2015 as U.S. patent publication 2015/0232287 A1; in co-pending parent U.S. patent application Ser. No. 14/574,561, filed 18 Dec. 2014, published 20 Aug. 2015 as U.S. patent publication 2015/0231801 A1; in co-pending parent U.S. patent application Ser. No. 14/593,010, filed 9 Jan. 2015, published 20 Aug. 2015 as U.S. patent publication 2015/0232289 A1, and in co-pending parent U.S. patent application Ser. No. 14/602,784, filed 22 Jan. 2015, published 20 Aug. 2015 as U.S. patent publication 2015/0232290 A1 are all suitable for use in the practice of this invention.

Use of these air flow limiters allows one large vacuum pump to be used without risk to the system or to the resin being conveyed. An added advantage of a very large vacuum pump is that it can fill multiple receivers or other devices simultaneously with resin. As used herein, the term "receiver" denotes the type of apparatus disclosed in U.S. Pat. Nos. 6,089,794; 7,066,689, and 8,753,432. The disclosures of these patents are hereby incorporated by reference.

In one of its aspects, this invention provides apparatus for conveying granular plastic resin material from a resin supply preparatory to molding or extruding that material into finished or semi-finished plastic parts, where the apparatus preferably includes at least one receiver or other device for receipt and temporary storage of the granular plastic resin material preparatory to molding or extrusion, a vacuum pump, a first conduit for conveyance of the granular plastic resin material from the supply to the receiver or other device, a second conduit for conveyance of a vacuum stream from the receiver or other device to the vacuum pump, and a variable speed drive for the vacuum pump.

The apparatus desirably further includes a microprocessor for controlling speed of the drive for the vacuum pump.

The apparatus yet further desirably includes a sensor for sensing one or more flow parameters such as static pressure, dynamic pressure, velocity, and the like preferably but not necessarily in the second conduit, with the sensor being connected to the microprocessor for furnishing flow parameter information to the microprocessor.

The apparatus may further include a plurality of flow parameter sensors for sensing flow parameter at selected positions, usually but not necessarily in the second conduit, and furnishing flow parameter information therefrom to the microprocessor.

The apparatus may yet further preferably include an algorithm within the microprocessor or associated therewith, for controlling the speed of the drive according to information received from the flow parameter sensor(s).

The apparatus may further include an air flow limiter desirably located between an outlet of the second conduit and a suction inlet of the vacuum pump.

The apparatus may further include a flow parameter sensor desirably located between the air flow limiter and a suction inlet to the pump. The apparatus may yet further include a second flow parameter sensor upstream of the air flow limiter but downstream of the receiver closest to the vacuum pump.

The air flow limiter portion of the invention may further include a solenoid for maintaining the air flow limiter at one of two pre-selected air flow settings according to whether the solenoid is energized. The air flow limiter may further be adjustable between a plurality of positions for differing air flows at each of the positions of the air flow limiter.

The flow parameter sensor may sense static pressure, or dynamic pressure, or temperature, or velocity, or relative humidity, all of which are embraced by the term "flow parameter" as used herein, and/or a plurality of sensors may be used including static pressure sensors, dynamic pressure sensors, anemometers, thermometers and hygrometers.

It is yet further within the scope of this invention to have the microprocessor connect with the variable speed drive wirelessly over the Internet, or by other wireless communication.

It is further within the scope of this invention to have the microprocessor connect with the flow parameter sensor or sensors wirelessly over the Internet or by other wireless communication.

The foregoing outlines rather broadly features of the invention in order that the detailed description of the invention that follows may be best understood. Additional features and advantages of the invention, as described hereinafter, may form the subject of certain of the claims of the application. It will be appreciated by those skilled in the art that the concepts and specific embodiments disclosed herein may be readily utilized as a basis for modifying or designing apparatus or other methods for carrying out the goals and results attained by this invention. It should also be realized by those skilled in the art that such equivalent implementations do not depart from the spirit and scope of the invention as set forth in the appended claims.

DETAILED DESCRIPTION OF THE INVENTION

In this application, unless otherwise apparent from the context it is to be understood that the use of the term "vacuum" means "air at slightly below atmospheric pressure." The "vacuum" (meaning air at slightly below atmospheric pressure) provides a suction effect that is used to draw granular plastic resin material out of a supply and to convey that granular plastic resin material through various conduits to receivers or other devices such as gravimetric blenders in which the granular resin material can be temporarily stored before being molded or extruded. Hence, when reading this application it is useful for the reader mentally to equate the term "vacuum" with the term "suction".

A fixed air flow limiter works for one resin conveying line size only. For example, an air flow limiter designed to limit flow to 100 SCFM is likely correct for 2 inch line size, as that air flow limiter limits velocity to the desired range for a 2 inch line. If a 1.5 inch line is a part of the system, the flow rate through that line should be reduced to about 70 SCFM. A fixed, non-adjustable CFM limiter cannot do both.

The invention may use a flow limiter having two settings, with the limiter preferably being solenoid operated as disclosed in co-pending U.S. patent application Ser. No. 14/593,010, published 20 Aug. 2015 as U.S. patent publication 2015/0232289 A1.

Figure 1:
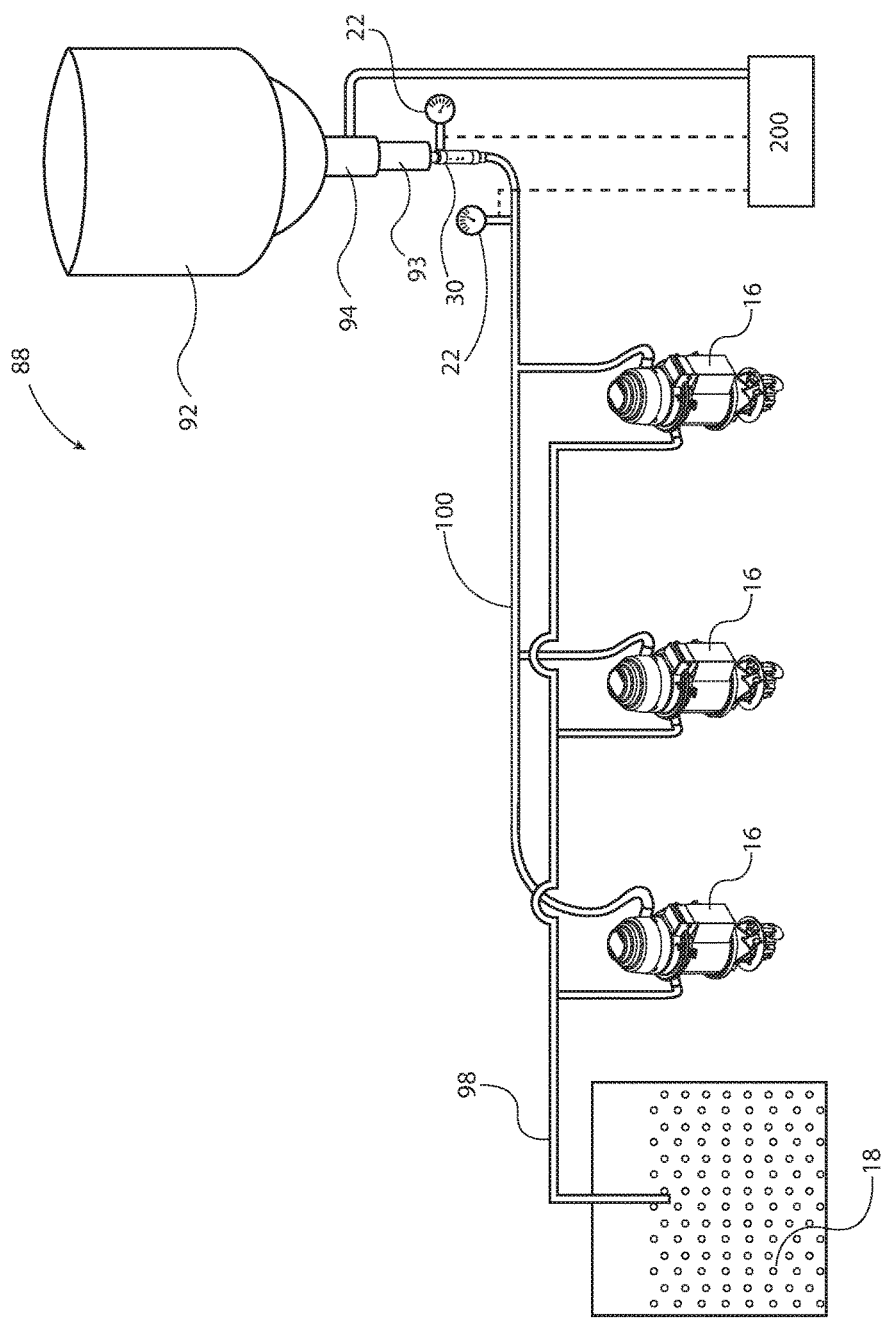
FIG. 1 is a schematic diagram of a resin delivery system according to the invention.

Referring to the drawings in general and to FIG. 1 in particular, apparatus for conveying granular plastic resin material from the supply to receivers or to other devices that retain and dispense the resin material when needed by a process machine is illustrated in FIG. 1. The apparatus, which is designated generally 88 in FIG. 1, preferably includes a vacuum pump designated generally 92 and shown schematically in FIG. 1. The vacuum pump preferably includes a vacuum pump suction head 93 and a variable speed drive unit designated 94, both of which are also shown schematically in FIG. 1. Connected to the vacuum pump suction head 93 is a suitable air flow limiter 30 shown only in schematic form in FIG. 1, but preferably of the type shown in detail in FIGS. 5 through 15. Air flow limiter 30 receives vacuum drawn by vacuum pump 92 through vacuum drawing conduit 100.

Still referring to FIG. 1, vacuum drawing conduit 100 is connected to a plurality of receivers 16 or other devices, each of which receives, retains and dispenses, as needed, granular plastic resin material to a process machine, such as an extruder or a molding press, as located preferably below or adjacent to a receiver 16. The process machines are not illustrated in FIG. 1 to enhance the clarity of the drawing. Receivers 16 are preferably of the type disclosed and claimed in U.S. Pat. No. 8,753,452. Other suitable devices such as dryers, gravimetric blenders, and the like may be used in place of or in addition to the illustrated receivers.

Further illustrated in FIG. 1 is a hopper 18 for storage of granular plastic resin material therein and a resin conveying conduit 98, which serves to convey resin drawn from hopper 18 and to deliver the resin to respective receivers 16 as vacuum is drawn by vacuum pump 92, with vacuum propagating upstream through air flow limiter 30, vacuum drawing conduit 100, the various receivers 16, and resin conveying conduit 98 to hopper 18.

Air, more specifically vacuum, is drawn out of the top of air flow limiter 30 by vacuum pump 92 as illustrated in FIG. 1. The air flow limiter 30 is preferably one of the types of air flow limiters illustrated in FIGS. 2 through 15 hereof. Note that air flow limiter 30 is vertically oriented, for air flow therethrough in a vertically upwards direction.

During operation of the resin conveying system shown schematically in FIG. 1, upon actuation of vacuum pump 92, vacuum is drawn at vacuum pump suction head 93. This vacuum, as it propagates to hopper 18 through receivers 16, serves to draw resin out of hopper 18 and into respective receivers 16. In the embodiments illustrated, air flow limiter 30 limits the suction or vacuum drawn by vacuum pump 92 through the receivers 16, which vacuum then propagates through receivers 16 via resin conveyance line 98 to resin supply 18 to draw resin from the supply 18 into receivers 16. Note that in the embodiment illustrated in FIG. 1, a single air flow limiter 30 limits the vacuum drawn through all receivers 16 that form a portion of the granular resin conveying system illustrated in FIG. 1.

Air flow limiter 30 is preferably in the general form of a vertically oriented tube, preferably having inlet and outlet ends 54, 56 respectively. The tubular character of the preferred air flow limiter 30 is apparent from FIGS. 2 through 5, where air flow limiter 30 preferably includes a vertically oriented exterior tube 32, with open-end caps 58, 60 defining and preferably providing open inlet and outlet ends 54, 56 respectively. End caps 58, 60 are open, preferably of generally cylindrical configuration, and are preferably configured to fit closely about vertically oriented tube 32 so as to provide a substantially air tight fit between end caps 54, 56 and tube 32.

Figure 4:
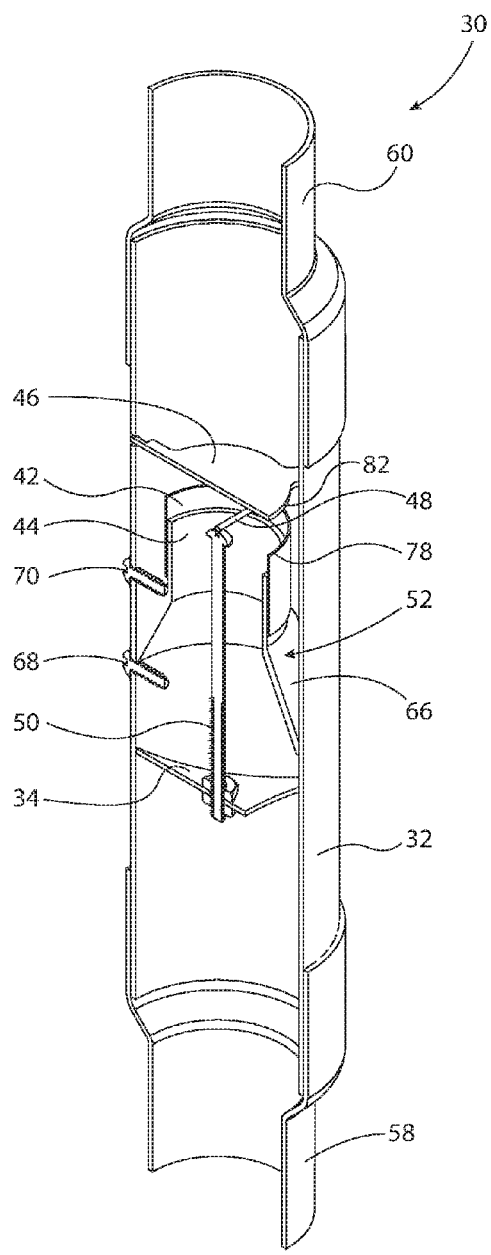
FIG. 4 is a slightly rotated sectional view of the air flow limiter illustrated in FIGS. 2 and 3, with the section taken at arrows 4-4 in FIG. 3.

As illustrated in FIG. 4, air flow limiter 30 preferably includes, within vertically oriented exterior tube 32, a horizontally positioned plate 46, which is oriented perpendicularly to the axis of tube 32. Plate 46 is preferably configured as a circular disk of lesser diameter than the inner diameter of vertically oriented tube 32, with plate 46 further preferably including three legs extending outwardly from the circular interior disk portion of plate 46. Legs of plate 46 are designated 62 in FIG. 8, while the circular interior portion of plate 46 is designated 64 in FIG. 8. Plate 46 is secured to the interior of vertically oriented outer tube 32 by attachment of legs 62 to the interior surface of tube 32. Any suitable means of attachment, such as by welding, adhesive, mechanical screws, or end portions of legs 62 defining tabs fitting into slots within tube 32 as shown in FIG. 4, may be used.

As shown in FIGS. 4, 5, 6, and 7, a baffle 52 is positioned within vertically oriented outer tube 32, below plate 46. Baffle 52 has a lower conical portion 66 and an upper cylindrical portion 44, with cylindrical portion 44 defining a fixed internal tubular segment of air flow limiter 30. Baffle 52 is preferably retained in position by a pair of screws designated 68, 70 respectively. Baffle 52 preferably rests on screw 68. Screw 70 preferably fits against the fixed internal tubular segment 44 portion of baffle 52 to secure baffle 52 in position within vertically oriented external tube 32. Lateral force applied by screw 70 in a direction perpendicular to the axis of vertically oriented external tube 32, with screw 70 in contact with fixed internal tubular segment 44, serves to effectively retain baffle 52 against movement within vertically oriented external tube 32.

Figure 8:
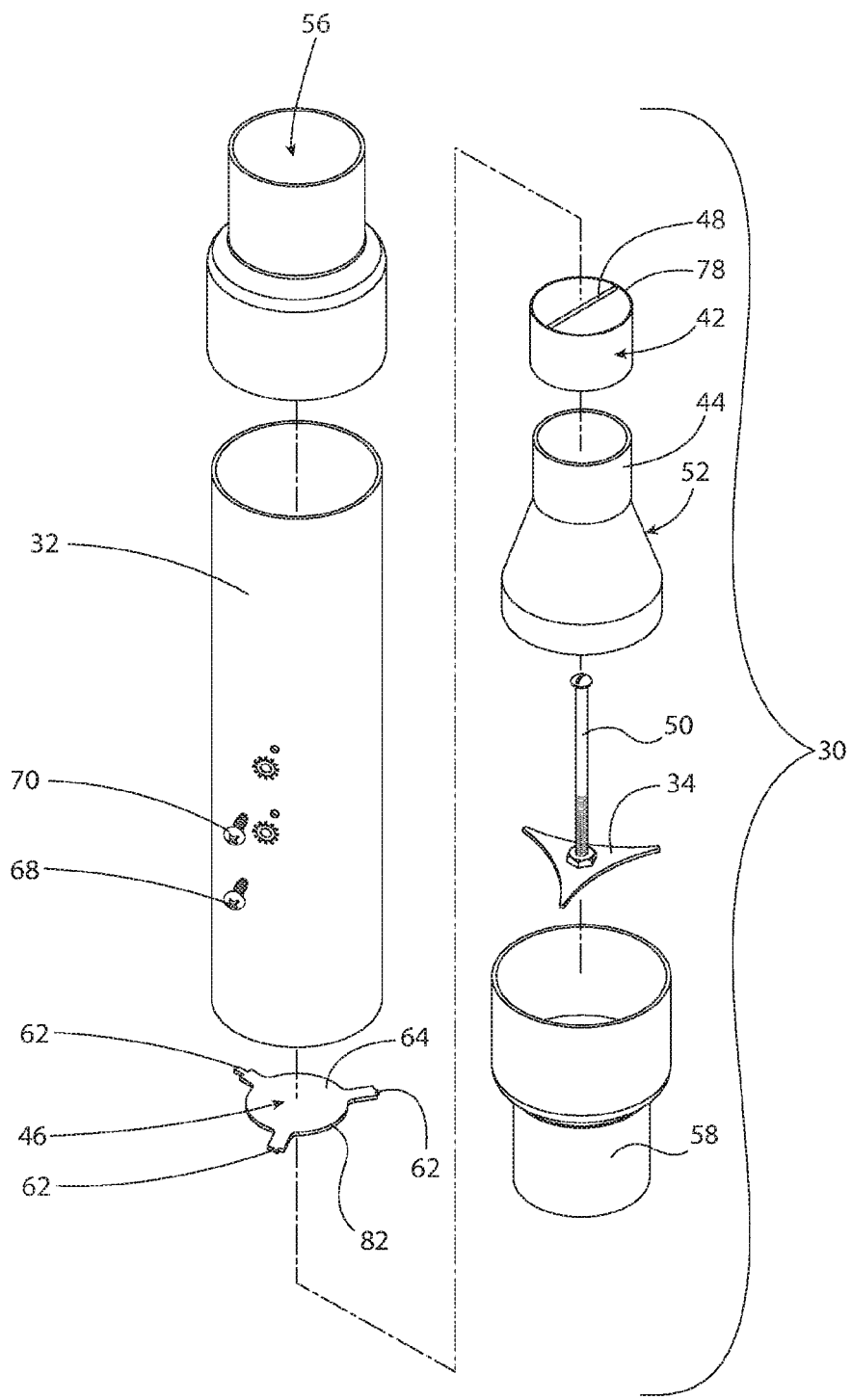
FIG. 8 is an exploded isometric view of the air flow limiter illustrated in FIGS. 2 through 7.
Figure 9:
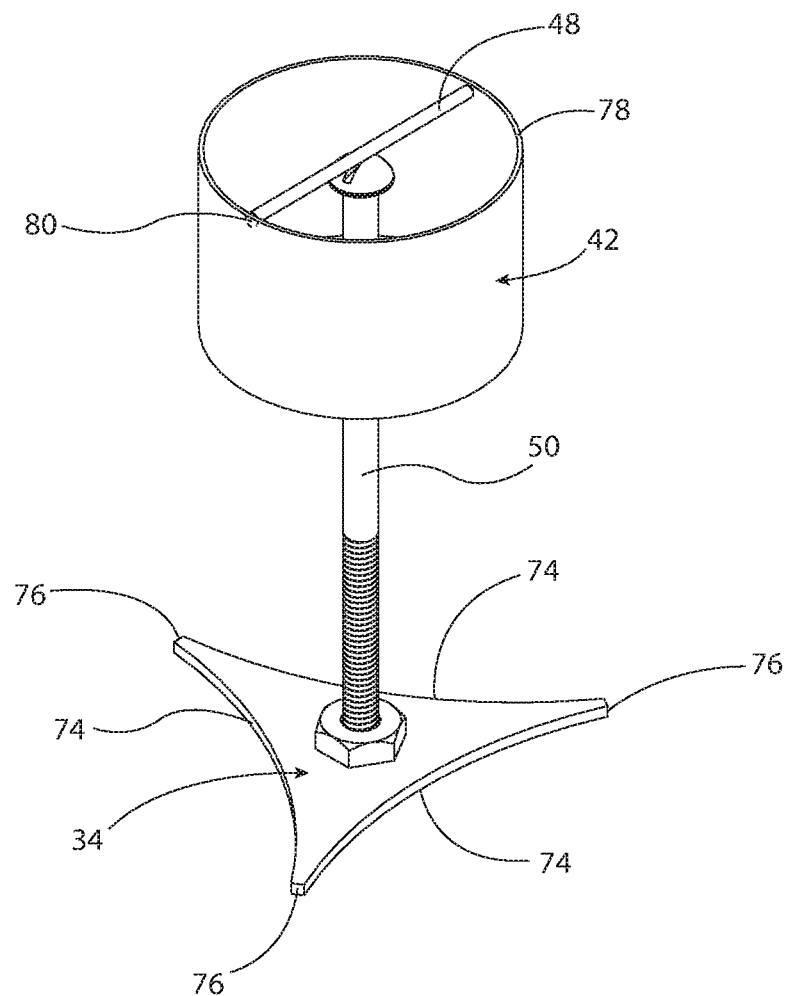
FIG. 9 is an isometric view of the movable portion of the air flow limiter illustrated in FIGS. 2 through 8.

The upper portion of baffle 52, defining fixed internal tubular segment 44, is adapted for sliding telescopic engagement with and for movement therealong by movable tubular segment 42. Movable tubular segment 42 moves telescopically along the exterior of fixed interior tubular segment 44. Fixed to movable tubular segment 42 is a first strut 48 preferably extending transversally across the upper portion of movable tubular segment 42 and preferably secured on either end to movable tubular segment 42, as illustrated in FIG. 8. Preferably extending downwardly from first strut 48 is a second strut 50, preferably secured to first strut 48 and preferably also to a sail 34, as illustrated in FIGS. 8 and 9.

Movable sail 34 is preferably planar and positioned fixedly on second strut 50 to remain perpendicular with respect to the axis of vertically oriented outer tube 32. Movable sail 34 is preferably of generally triangular configuration, as best illustrated in FIGS. 8 and 9, with the sides of the triangle curving slightly inwardly. The curved edges 72 of movable sail 34 converge and terminate to form small rectangularly shaped extremities of sail 34, which are designated 76 in FIG. 9. "Rectangular" denotes the shape of the radially outwardly facing surfaces 76 of the extremities of triangularly shaped sail 34, as best illustrated in FIG. 9.

Movable sail 34 is positioned within generally vertically oriented outer tube 32 so that rectangular extremity surfaces 76 are closely adjacent to but do not contact the inner surface of vertically oriented outer tube 32, so long as sail 34 moves vertically up and down within vertically oriented external tube 32. The rectangular shape of extremities 76 with their outwardly facing planar surface assures minimal friction and consequent minimal resistance to movement of movable sail 34 in the event one of rectangular extremities 76 contacts the interior surface of vertically oriented tube 32, should sail 34 for some reason move laterally or otherwise and become skew to the vertical axis of tube 32.

Figure 6:
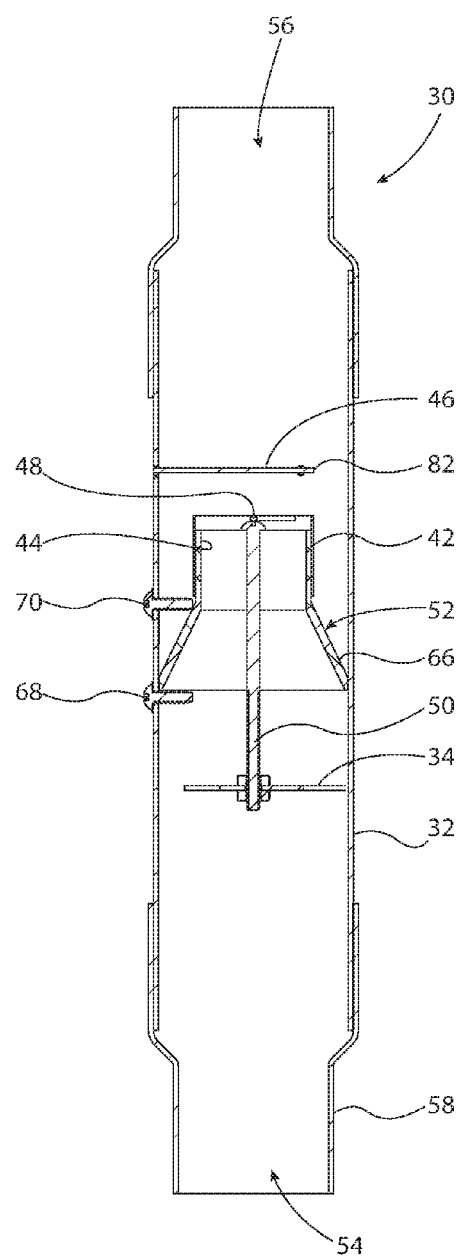
FIG. 6 is a sectional view in elevation, similar to FIG. 5, of the air flow limiter illustrated in FIGS. 2 through 5, but with the air flow limiter internal parts in position whereby there is no air entering the air flow limiter and hence there is no air flow upwardly through the air flow limiter, in contrast to the condition with such air flow shown in FIG. 5.

Movable internal tubular segment 42 is telescopically movable, unitarily with sail 34, relative to and along the exterior of fixed internal tubular segment 44. A lower limit of movement of movable tubular segment 42 is illustrated in FIG. 6, where the first strut portion 48 of movable tubular segment 42 (shown in FIG. 8) rests on the upper circular edge of fixed internal tubular segment 44. This is the condition when no air is flowing or drawn through the air flow limiter and gravity causes sail 34 together with movable internal tubular segment 42 to drop, with first strut 48 coming to rest on the upper circular edge of fixed tubular segment 44. The limiter 30 is ready to receive air at bottom 54 when vacuum is drawn out upper chamber 56, because the upper end of movable internal tubular segment 42 is open, as shown in FIG. 4.

Figure 5:
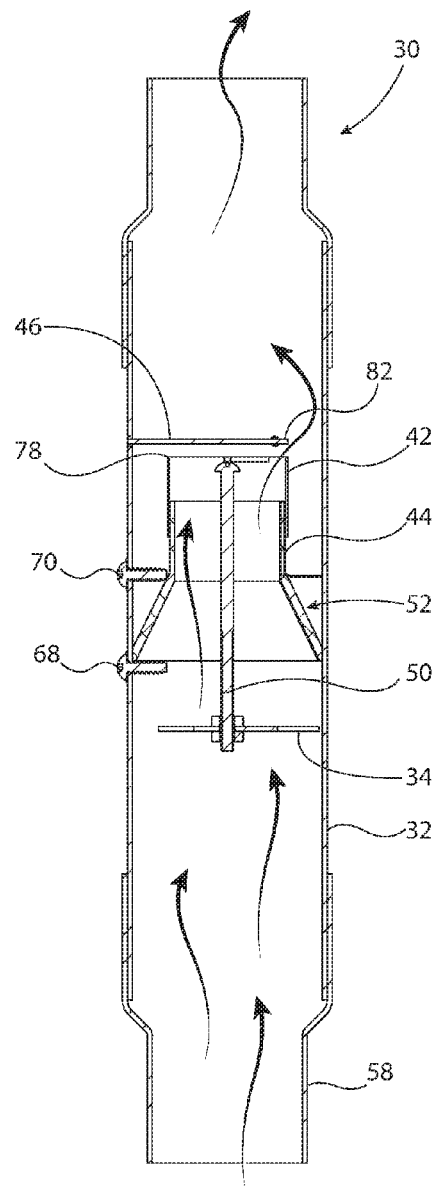
FIG. 5 is a sectional view in elevation of the air flow limiter illustrated in FIGS. 2, 3 and 4, with the section taken at lines and arrows 4-4 in FIG. 3, with air flow through the air flow limiter being depicted in FIG. 5 by curved dark arrows.
Figure 7:
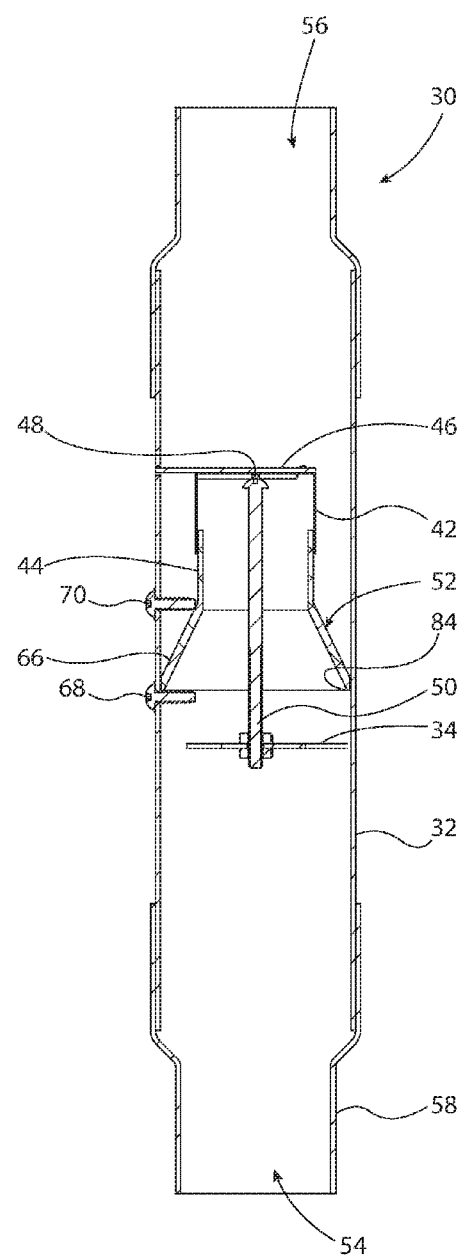
FIG. 7 is a sectional view in elevation, similar to FIGS. 5 and 6, of the air flow limiter illustrated in FIGS. 2 through 6, but with the air flow limiter internal parts in position where there is an excessive amount of air, over and above the preselected design limit, attempting to enter the air flow limited but there is no air flowing upwardly through the air flow limiter due to the air flow limiter valve having moved to block air flow upwardly through the air flow limiter, in contrast to the air flowing upwardly through the air flow limiter as shown in FIG. 5.

When air is flowing through an air flow limiter 30, as illustrated generally in FIG. 5, the moving air pushes against movable sail 34, moving it upwardly. Movable internal tubular segment 42 moves upwardly unitarily with sail 34 due to the fixed connection of movable tubular segment 42 and movable sail 34 made via first and second struts 48, 50, as illustrated in FIG. 7.

If air flow upwardly through an air flow limiter 30 reaches an extreme value, above an acceptable level of operation of the portion of the resin delivery system of which air flow limiter 30 is a part, the excessive force (resulting from the high volume of air flow contacting sail 34) pushes sail 34 upwardly to the point that upper annular edge 78 of movable internal tubular segment 42 contacts plate 46. In this condition, which is illustrated in FIG. 7, no air can pass between the upper annular edge 78 of movable tubular segment 42 and flow limiting horizontal plate 46, and air flow stops.

Once air flow stops through vertically oriented outer tube 32, gravity pulling downwardly on sail 34, connected movable internal tubular segment 42, and first and second struts 48, 50, causes these parts, which may be connected together and/or fabricated as a single integral assembly instead of a collection of individual parts assembled together such as shown in FIG. 9, to move downwardly thereby again permitting air flow upwardly through air flow limiter 30 as depicted generally in FIG. 5. Consequently, air flow limiter 30 is self-regulating in that when air flow is too high, the force of air moving or impinging on sail 34 pushes movable internal tubular segment 42 upwardly until upper annular edge 78 of movable tubular segment 42 contacts plate 46 and no air can then escape upwardly between the upper annular edge 78 of movable tubular segment 42 and plate 46. This stops air flow through air flow limiter 30 until downward movement of sail 34 together with movable internal tubular segment 42 moves upper annular edge 78 of movable tubular segment 42 away from plate 46, again permitting air to flow through the upper extremity of movable tubular segment 42, with air passing between upper annular edge 78 of movable internal tubular segment 42 and flow limiting horizontal plate 46, and then escaping through upper outlet end 56 of air flow limiter 30. All air flow is upwards through limiter 30, which, when of the preferred type shown in FIGS. 2 through 15, must be essentially vertically oriented in order to operate properly.

With the self-regulating characteristic of air flow limiter 30, the assembly consisting of movable internal tubular segment 42, first and second struts 48, 50, and sail 34 may oscillate somewhat about the position at which air flow, drawn by suction created by vacuum pump 92, is at the desired level, as vacuum pump 92 drawing air through flow limiter 30 varies in cubic feet per minute of air drawn.

Desirably, ends of first strut 48, which is depicted as being horizontally disposed in the drawings, are mounted in movable tubular segment 42 in movable fashion such that first strut 48 can move slightly, rotationally, relative to movable internal segment 42. This is to provide a small amount of "play" in the event movable sail 34 and second strut 50, which is vertically oriented and connected to movable sail 34, become skew with respect to the vertical axis of vertically oriented exterior tube 32. Should this occur, the movable characteristic of first strut 48, being slightly rotatable relative to movable internal tubular segment 42, effectively precludes movable internal tubular segment 42 from binding with respect to fixed internal tubular segment 44 and thereby being restricted from what would otherwise be freely telescoping movement of movable internal tubular segment 42 relative to fixed internal tubular segment 44.

Desirably first strut 48 is rotatable relative to movable internal tubular segment 42, to provide maximum freedom of vertical motion of movable internal tubular segment 42 in the event movable sail 34 becomes skew to the axis of vertically oriented exterior tube 32, with consequent frictional force restricting vertical movement of movable sail 34.

Baffle 52 preferably includes two portions, the upper portion preferably being defined by fixed internal tubular segment 44 and a lower portion preferably being defined by conical portion 66 of baffle 52. A lower edge of baffle 52 is circular and is designated 84 in the drawings. Circular edge 84 fits closely against the annular interior wall of vertically oriented exterior tube 32 so that all air passing upwardly through air flow limiter 30, namely through vertically oriented exterior tube 32, is constrained to flow through the interior of baffle 52. The tight fitting of the circular lower edge of baffle 52 against the interior wall of vertically oriented exterior tube 32 forces all air entering flow limiter 30 from the bottom to flow through the interior of baffle 52, flowing upwardly through lower conical portion 66 of baffle 52.

The air then flows, due to suction drawn by vacuum pump 92, further upwardly through the interior of fixed internal tubular segment 44. Thereafter, if movable internal tubular segment 42 is spaced away from flow limiting horizontal plate 46, air flows along the surface of movable internal tubular segment 42, passing the upper annular edge 78 of movable internal tubular segment 42; air then flows around the space between edge 82 of flow limiting horizontal plate 46 and the interior annular wall of vertically oriented exterior tube 32. The air then flows out of air flow limiter 30 via open outlet end 56 formed in end cap 60, and into suction head 93, through which it is drawn by variable speed drive 94 of vacuum pump 92.

Figure 10:
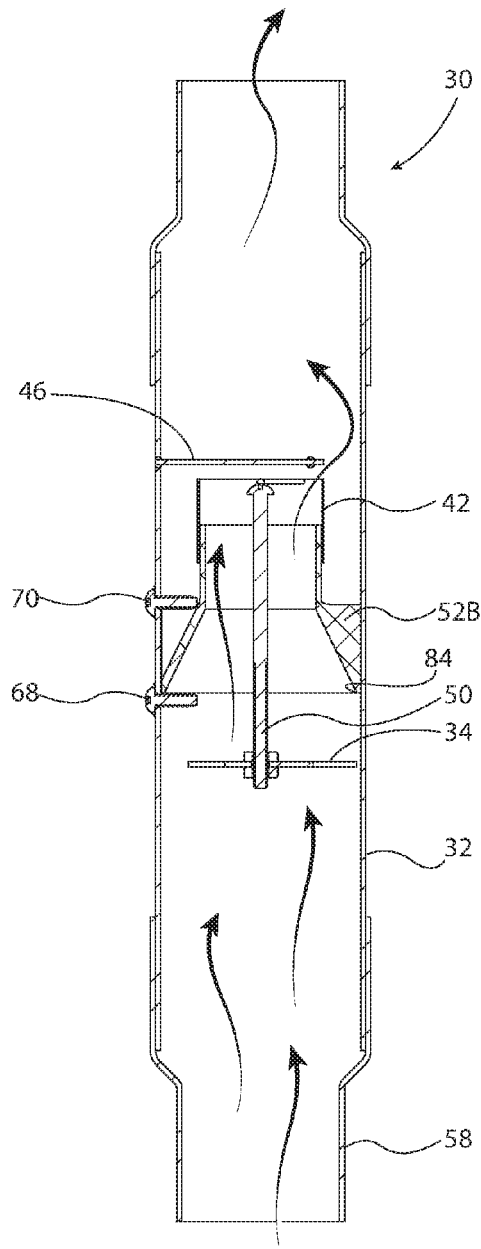
FIG. 10 is a sectional view of an air flow limiter similar to FIGS. 2 through 7, illustrating an alternate construction of the baffle portion of the air flow limiter.

As illustrated in FIG. 10, filler material 52B, preferably poured in place plastic or adhesive, may be positioned between the outwardly facing conical surface of baffle 52 and the inner surface of tube 32 to provide structured rigidity.

Figure 11:
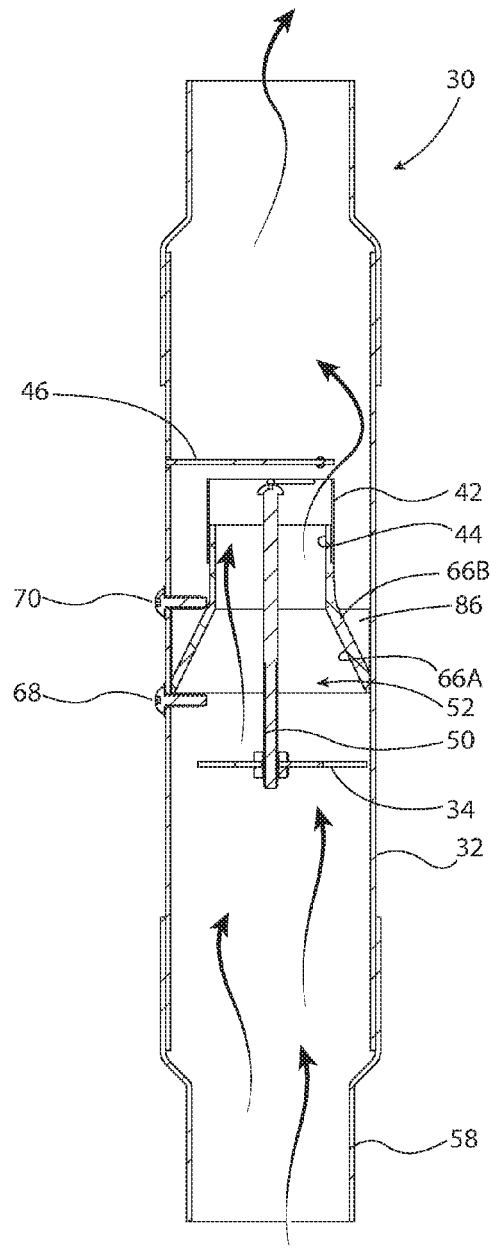
FIG. 11 is sectional view of an air flow limiter similar to FIGS. 2 through 7 and 10, illustrating a second alternate construction of the baffle portion of the air flow limiter.

In an alternate embodiment of air flow limiter 30, illustrated in FIG. 11, baffle 52 may be constructed from two very thin pieces that fit closely together, with the two pieces being in essentially facing contact in the area where they define fixed internal tubular segment 44, but diverging one from another in the area where they define conical portion 66 of baffle 52. As illustrated in FIG. 11, the two portions of baffle 52 defining conical portion 66 are designated "66A" and "66B" where they diverge, with baffle inner portion 66A serving to channel air flow upwardly through vertically oriented exterior tube 32 into fixed internal tubular segment portion 44 of baffle 52. The spaces between the lower parts of baffle portions 66A and 66B, and between baffle portion 66B and the inner surface of tube 32 are preferably filled with a filler material 86 to provide additional assurance that all air entering vertically oriented exterior tube 32 from the bottom flows through fixed internal tubular segment 44 and on through movable internal tubular segment 42, and does not pass around the edge of baffle 52, namely between baffle 52 and the interior surface of vertically oriented exterior tube 32. Filler material 86, which is desirably plastic or adhesive, provides additional structural rigidity for flow limiter 30.

Figure 2:
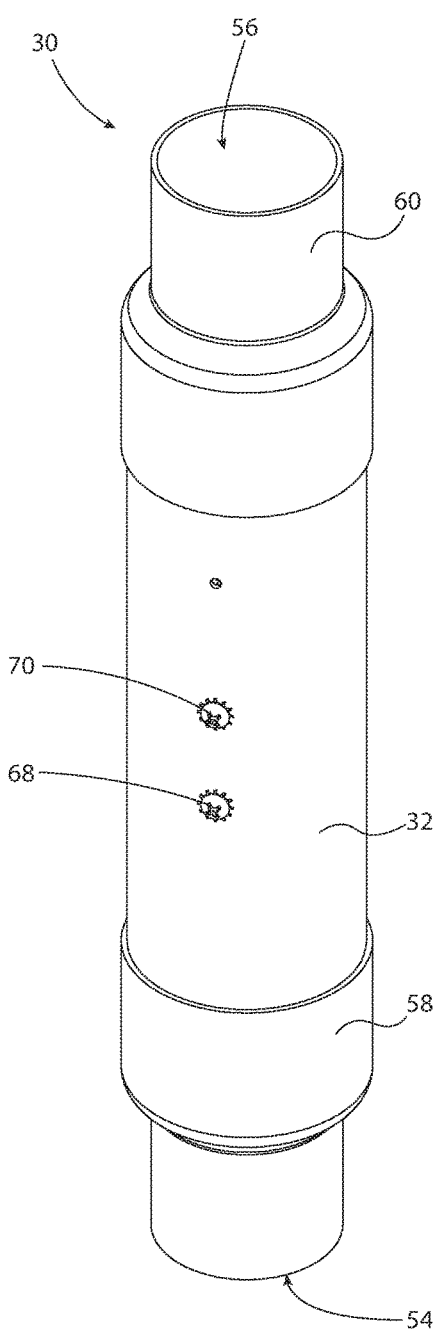
FIG. 2 is an isometric view of the exterior of an air flow limiter portion of the apparatus for pneumatically conveying granular plastic resin, as disclosed in co-pending patent application Ser. No. 14/185,016, published 20 Aug. 2015 as U.S. patent publication 2015/0232287 A1, and Ser. No. 14/574,561, published 20 Aug. 2015 as U.S. patent publication 2015/0232289 A1.
Figure 3:
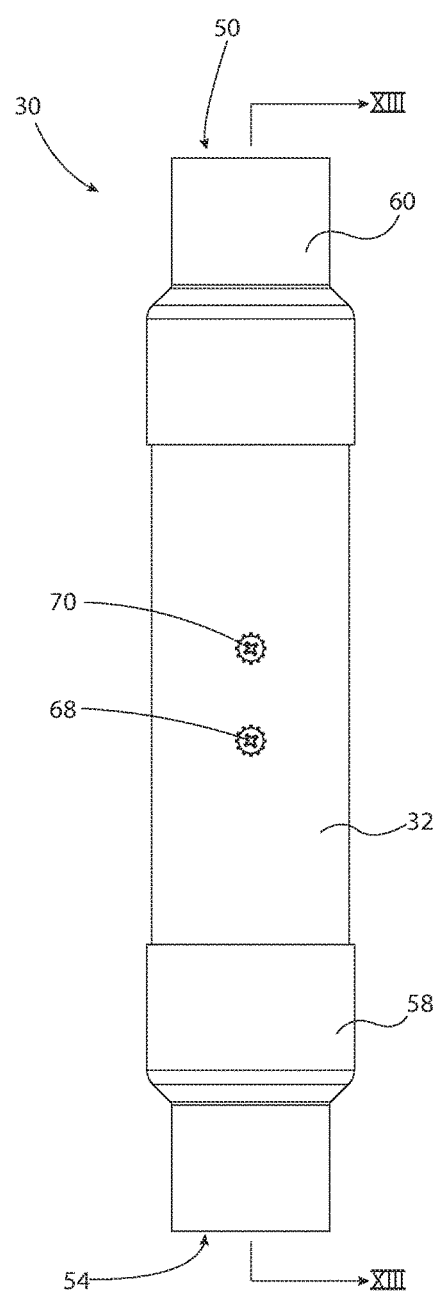
FIG. 3 is a front elevation of the air flow limiter illustrated in FIG. 2.
Figure 13:
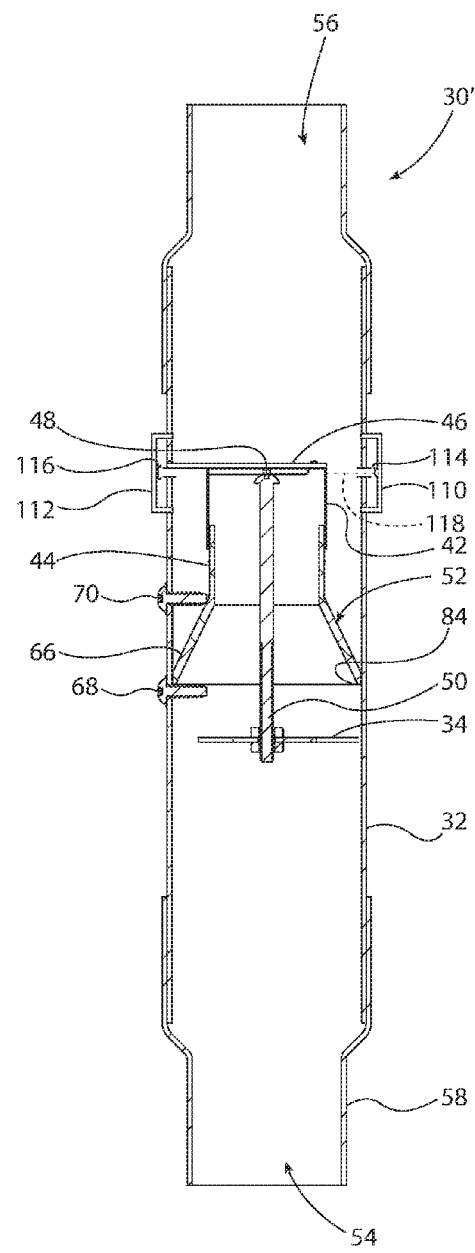
FIG. 13 is a sectional view in elevation, similar to FIG. 12, of the air flow limiter disclosed in FIG. 12 and in co-pending Ser. No. 14/593,010, filed 9 Jan. 2015 and published 20 Aug. 2015 as U.S. patent publication 2015/0232289 A1, with the electromagnetic detector beam being blocked by the moveable valve portion of the air flow limiter, thereby indicating that no air is flowing through the air flow limiter.

In another alternative environment of the air flow limiter, baffle 52 is one piece, preferably molded plastic, as illustrated in FIGS. 2 and 13, where baffle 52 is designated 52B to distinguish it from the baffle construction illustrated in FIGS. 10 and 11 and the baffle construction illustrated in the earlier drawing figures. In the baffle construction illustrated in FIG. 13, the one piece construction means that there is no need or space for any filler material. The baffle construction illustrated in FIGS. 5 through 7 is preferred.

The assembly illustrated in FIG. 9 comprising the moveable internal tubular segment 42, first strut 48, second strut 50 and moveable sail 34 may preferably be constructed as a single piece or several pieces as required. The assembly of moveable internal segment 42, first and second struts, 48, 50 and moveable sail 34 is referred to herein as a "sail assembly." It is not required that first and second struts 48, 50 be separate pieces; they may preferably be fabricated as a single piece. Additionally, second strut 50, which has been illustrated as a machine screw in FIGS. 8 and 9, need not be a machine screw. Any suitable structure can be used for second strut 50 and it is particularly desirable to fabricate first and second struts 48 and 50 from a single piece of plastic or metal, by molding, or by machining, or by welding, or by otherwise fastening two pieces together. Similarly with the hex nut, which is unnumbered in FIGS. 8 and 9 and illustrated there, any other suitable means for attachment of the second strut or a vertical portion of a strut assembly to moveable sail 34 may be used.

Figure 12:
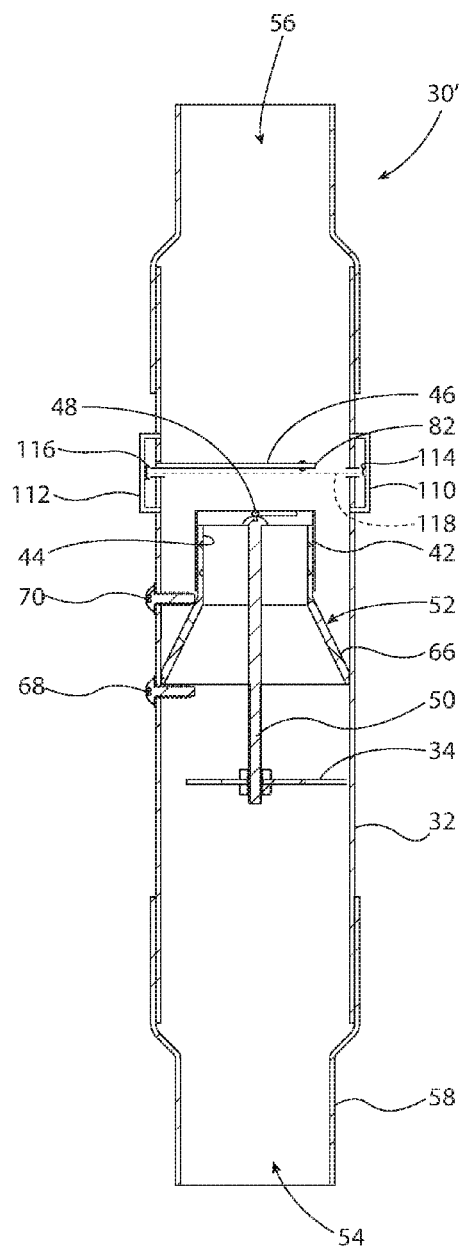
FIG. 12 is a sectional view of an air flow limiter of the type disclosed in co-pending Ser. No. 14/593,010, filed 9 Jan. 2015 and published 20 Aug. 2015 as U.S. patent publication 2015/0232289 A1, which is highly similar to the air flow limiters illustrated in FIGS. 2 through 11, with the sectional view being taken in elevation, similarly to FIG. 6, with an electromagnetic beam for detecting position of the movable valve portion of the air flow limiter.

FIGS. 12 and 13 illustrate an air flow limiter 30' having closed/open sensing capability as disclosed in pending U.S. patent application Ser. No. 14/593,010 filed 9 Jan. 2015 and published 20 Aug. 2015 as U.S. patent publication 2015/0232289 A1. The air flow limiters illustrated in FIGS. 14 and 15 as 30" are also suitable for use as flow limiter 30 in the instant invention, as are the air flow limiters 30' illustrated in FIGS. 12 and 13.

Figure 14:
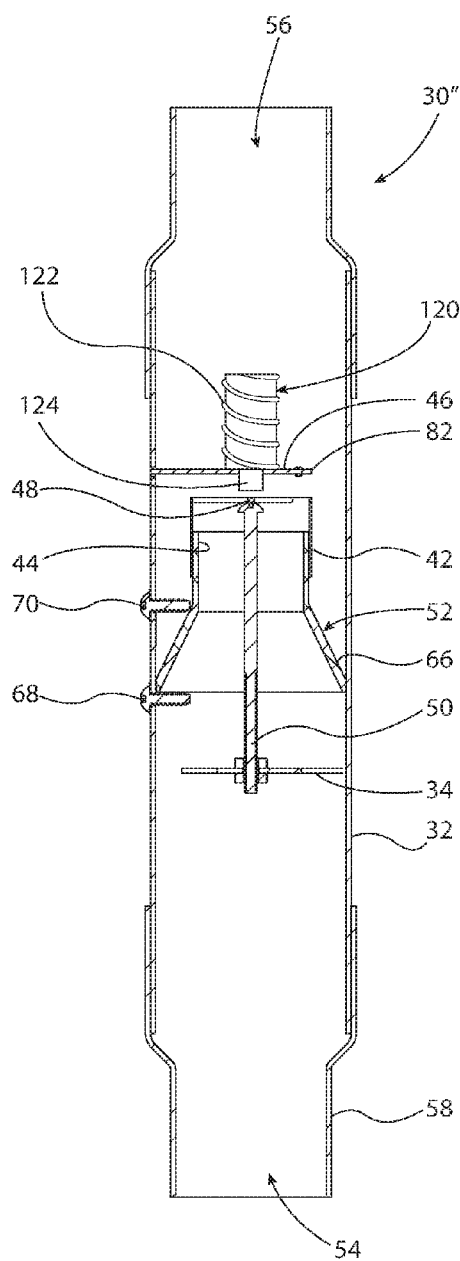
FIG. 14 is a sectional view in elevation, similar to FIG. 6, of an adjustable air flow limiter of the type disclosed in co-pending U.S. patent application Ser. No. 14/602,784, published 20 Aug. 2015 as U.S. patent publication 2015/0232290 A1, which is highly similar to the air flow limiters illustrated in FIGS. 2 through 13, with the air flow limiter internal parts in position whereby a moderate amount of air is entering and flowing through the air flow limiter, the sail assembly has been lifted by the air flow, and the air flow limiter internal valve has not contacted a "stop" defining an intermediate valve position and hence an intermediate maximum air flow rate through the air flow limiter. The air flow limiter is equipped with a solenoid actuated piston, allowing two different geometries and "stop" positions for two different maximum permitted levels of air flow through the limiter. The solenoid actuated piston is in the extended solenoid energized position in FIG. 14.
Figure 15:
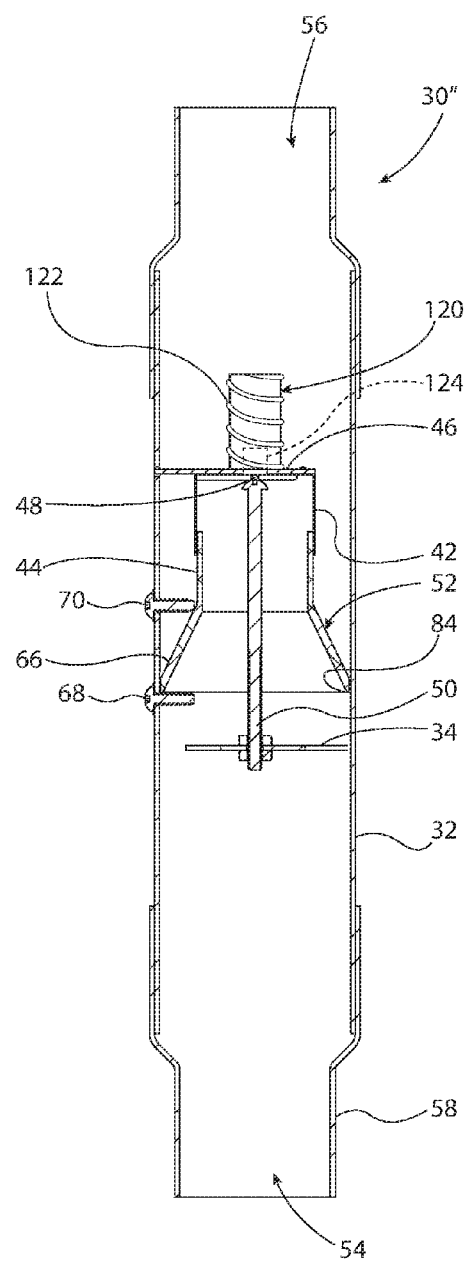
FIG. 15 is a sectional view in elevation of the adjustable air flow limiter illustrated in FIG. 14, with the "stop" provided by the solenoid actuated piston illustrated in FIG. 14 withdrawn and the air flow limiter internal parts in position whereby no air can flow through the air flow limiter due to those internal parts blocking air flow, due to instantaneous air flow exceeding the maximum design value.

FIGS. 14 and 15 illustrate flow limiters 30" that are adjustable. These flow limiters are disclosed in U.S. patent application Ser. No. 14/602,784 filed 22 Jan. 2015, published 20 Aug. 2015 as U.S. patent publication 2015/0232290 A1.

Air flow limiter 30 preferably contain no springs. While an electromagnetic sensor is illustrated in FIGS. 12 and 13 and is described above, air flow limiter 30 requires no sensors to provide feedback to a control device; no sensors are needed because flow limiter 30 is self-regulating.

Each air flow limiter preferably includes a tubular valve, closing against a flat surface, where the tubular valve is defined by movable internal tubular segment 42 closing against flow limiting horizontal plate 46. Movable internal tubular segment 42 is in the form of an open-ended cylinder and is connected to a plate in the form of movable sail 34 to move movable tubular segment 42 against flow limiting horizontal plate 46. The air flow limiter 30 preferably uses gravity alone to open the valve defined by the assembly of movable internal tubular segment 42 and movable sail 34 and the connecting structure therebetween.

In the air flow limiters illustrated in FIGS. 4 through 15, the movable internal tubular segment 42 is preferably made with a very thin wall, preferably from metal tubing, where the wall is preferably less than $\frac{1}{32}$ inch in thickness.

In the course of practice of the invention, different resin conveying and vacuum line sizes may be used. While 1½ inch and, less frequently, 2½ inch line sizes respectively are suggested and ordinarily used for the resin conveying line, the line size may be varied.

Microprocessor 200 serves to control the variable frequency drive housed within the variable speed drive unit 94 of the vacuum pump 92. Microprocessor 200 governs overall operation of the variable speed drive unit 94 by regulating frequency and voltage of electrical power furnished to variable speed drive unit 94.

Desirably the basic programming of microprocessor 200 is provided as user inaccessible firmware. User programmability of a display and functionality of the microprocessor is provided to control, protect and monitor the variable frequency drive unit 94 of vacuum pump 92. Microprocessor 200 may also control associated circuit breakers or fuses associated with vacuum pump 92.

Microprocessor 200 desirably provides an operator interface in the form of pushbuttons and "On-Off" switches (neither of which are illustrated in the drawings), thereby providing means for an operator to start and stop vacuum pump 92 and to adjust operating speed of vacuum pump 92 either by adjusting voltage provided to the vacuum pump motor or by changing the frequency of the current supplied to the vacuum pump motor. Additional control functions available to an operator include reversing and switching between manual speed adjustment and automatic control as effectuated by microprocessor 200. Desirably, microprocessor 200 includes an alphanumeric display, indicator lights, and meters to provide information regarding operation of variable speed drive 94. Parameters displayed include voltage, current and frequency of the supplied electrical power, speed of the vacuum pump drive motor, instantaneous torque of the vacuum pump drive motor, and the like. An operator interface keypad and display are desirably provided on the front of microprocessor 200 (these are not shown in the drawings, to enhance drawing clarity), facilitating operator control and input of data as respecting microprocessor 200 and effectuating operation of variable speed drive 94 to provide optimal control over vacuum pump 92.

Use of the variable speed drive 94 provides significant cost reductions in the form of energy savings, which are especially pronounced when drive 94 is driving a vacuum pump such as vacuum pump 92. In typical pump applications, the load torque and load power vary with the square and the cube respectively of the speed of the rotating impeller element. Use of variable speed drive 94 provides a substantial power reduction as compared to fixed speed operation and results in only a relatively small reduction in speed of the vacuum pump. Vacuum pump 92 equipped with variable speed drive 94 when operating at about 65% of its rated speed consumes only about 25% of the power which would be required at full speed if a variable speed drive such as unit 94 were not used. Use of variable speed drive 94, together with microprocessor 200, facilitates optimal control of the flowing air stream, flow rate, pressure and the like.

Variable speed drive 94 for vacuum pump 92 is preferably the type of adjustable speed drive used in electromechanical drive systems to control AC motor speed and torque by varying motor input frequency and/or voltage. Variable speed drives of the type represented by variable speed drive 94 are also sometimes called "adjustable frequency drives" or "variable speed drives" of "AC drives" or "microdrives" or "inverter drives."

Variable speed drive 94 has three main subsystems: the vacuum pump drive motor, which is an AC motor; a main drive controller assembly; and a drive/operator interface, where microprocessor 200 functions as the operator.

Most desirably, the AC electric motor used to drive vacuum pump 92 and forming a portion of variable speed drive 94 is a three-phase induction motor; however, single phase motors can also be used, but three-phase motors are preferable. Synchronized motors may also be used, but three-phase induction motors are the most preferable for this invention.

The controller, parts of which are located within the variable speed drive housing 94, preferably includes a solid state power electronics conversion system, preferably including a rectifier bridge converter, a direct current link, and an inverter. The variable speed drive is desirably an AC-AC drive that converts AC line input into AC inverter output, all of which is controlled by microprocessor 200. It is also feasible to configure variable speed drive 94 as a DC-AC drive, in which case a required bridge rectifier converter for the variable speed drive is configured as a three-phase, 6 pulse, full wave, diode bridge. However, AC-AC drive is preferable. Some source inverter drives of the type which may be used as variable speed drive 94 provide higher power factors and lower harmonic distortion than phase controlled current source inverter drives or load commutator inverter drives. Most preferably, sinusoidal pulse width modulation is used to vary the drive motor voltage or current and frequency, thereby providing the control required for practice of the instant invention.

Preferably an embedded microprocessor present within drive 94 governs the overall operation of the variable speed drive controller, which in turn is a slave to microprocessor 200. Most desirably, basic programming of microprocessor 200 and the embedded microprocessor are both provided according to the user's specifications and desires. The embedded microprocessor for the variable speed drive within the variable speed drive unit 94 itself is most desirably user inaccessible. User programming of display portion of microprocessor 200 and variable and functional block parameters may be provided to control, protect and monitor the variable speed drive 94, the vacuum pump motor and any associated equipment. Typically, upstream of the basic variable frequency drive are circuit breakers or fuses, isolation contactors and EMC filters for reducing transfer of electromagnetic noise between a main power supply and the variable speed drive. Other and additional active and passive filters may also be incorporated.

The operator interface provided by microprocessor 200 provides a means for an operator to start and stop the vacuum pump motor and to adjust the operating speed of the motor. Additional operator control functions may include switching between manual speed adjustment and automatic control from an external process control signal such as a signal provided by one or more flow parameter sensors, or both, sensing one or more flow parameters within the resin conveying system, either or both upstream and downstream, from receiver(s) 16. An operator interface keypad and display (not illustrated in the drawings) may be provided on microprocessor 200. A keypad display of microprocessor 200 may be cable connected and mounted a short distance from the variable speed drive 94, or may be connected via the Internet for wireless communication with variable speed drive 94 from a remote locale. Variable speed drive 94 preferably includes a serial communications port, allowing the variable frequency drive to be configured, adjusted, monitored, and controlled using microprocessor 200.

Use of the variable speed drive saves energy over that required when operating an equivalent system directly from an AC power input line without a variable speed drive. The energy and cost savings are quite pronounced when a variable torque centrifugal fan or vacuum pump fan is used, where the load torque and required power vary with the square and cube respectively of the fan or impeller speed of the vacuum pump. Variable speed drive 94 provides a large power reduction as compared to fixed speed operation, with a relatively small reduction in speed being the penalty paid. Typically, a variable speed drive motor operating at 63% of full speed capacity consumes only about 25% of its full speed requirement for power.

Use of variable speed drive 94 brings about process and quality improvements in the system including better control over acceleration and speed of the pneumatic or vacuum powered resin stream; better control over the flow of vacuum or air downstream drawn through the receiver; and allows variation of flow rate according to monitoring provided by flow parameter sensors, as schematically represented by vacuum sensing gauge 22, with static and dynamic pressure, air speed, temperature, relative humidity and torque of the vacuum pump motor all being variables for input on which adjustments of the speed of the variable speed drive 94 and hence speed of vacuum pump 92 are made by microprocessor 200 and associated software.

A further advantage provided by variable speed drive 94 over fixed speed drives is that fixed speed drives require the vacuum pump motor to have a high starting torque and subject the motor to start-up current surges that are up to eight times the current consumption when the motor is operating at full speed. A variable speed drive such as drive 94 as disclosed herein does not start at a high starting torque but rather gradually ramps the motor of vacuum pump 92 up to an operating speed to lessen mechanical and electrical stress, thereby reducing maintenance and repair costs, and extending the life of the motor, the driven impeller or fan unit, and hence the entire resin conveying system.

Although schematic implementations of present invention and at least some of its advantages are described in detail hereinabove, it should be understood that various changes, substitutions and alterations may be made to the apparatus and methods disclosed herein without departing from the spirit and scope of the invention as defined by the appended claims. Moreover, the scope of this patent application is not intended to be limited to the particular implementations of apparatus and methods described in the specification, nor to any methods that may be described or inferentially understood by those skilled in the art to be present as described in this specification.

As one of skill in the art will readily appreciate from the disclosure of the invention as set forth hereinabove, apparatus, methods, and steps presently existing or later developed, which perform substantially the same function or achieve substantially the same result as the corresponding embodiments described and disclosed hereinabove, may be utilized according to the description of the invention and the claims appended hereto. Accordingly, the appended claims are intended to include within their scope such apparatus, methods, and processes that provide the same result or which are, as a matter of law, embraced by the doctrine of the equivalents respecting the claims of this application.

As respecting the claims appended hereto, the term "comprising" means "including but not limited to", whereas the term "consisting of" means "having only and no more", and the term "consisting essentially of" means "having only and no more except for minor additions which would be known to one of skill in the art as possibly needed for operation of the invention."

The following is claimed:

1. A method for pneumatically transporting granular polymeric resin material from a supply of granular polymeric resin material to a plurality of receivers for the granular polymeric material, for temporary storage of the granular polymeric resin material therein prior to molding or extrusion of the granular polymeric resin material into plastic parts comprising:
   a) actuating a vacuum pump to convey the granular polymeric resin material in a vacuum/air stream from the supply through a single conduit to the receivers for temporary storage of the granular polymeric resin material therein prior to molding or extruding the granular polymeric resin material into plastic parts, the conduit running between the supply and the receivers and extending from the receivers to the pump;
   b) providing a sensor in the conduit to sense at least one parameter of the vacuum/air stream flowing therethrough;
   c) varying the speed of the pump thereby providing control of the speed of the vacuum/air stream in the conduit by varying input electrical current furnished to the pump in response to the sensed parameter; and
   d) limiting speed of the vacuum/air stream to below a preselected level
      i) providing a concentric tube section in the conduit at the vacuum pump suction intake;
      ii) providing coaxial open-ended telescoping tubular segments within the tube section, an outer tubular segment being fixed to the section by means precluding air flow between the outer tubular segment and the tube section, the inner tubular segment being slideably axially movable along the fixed segment;
      iii) providing a stationary plate extending across the interior of and fixedly connected to the tube section between the telescoping tubular segments and the vacuum pump suction intake, positioned for contacting and limiting travel of the moveable tubular segment, the plate covering an outlet end of the movable tubular segment upon contact therewith; and
      iv) providing a sail connected to the moveable segment, positioned in the tube upstream of the telescoping segments;
   by space between the plate and the inner tubular segment regulating area available for passage therethrough of the vacuum/air stream, thereby providing additional control of the speed of the vacuum/air stream in the conduit.

2. The method of claim 1 further comprising closing the conduit upon the vacuum/air stream passing therethrough exceeding a preselected velocity.

3. The method of claim 1 further comprising closing the conduit upon cessation of vacuum/air stream passage therethrough.

4. The method of claim 1 further comprising closing the conduit upon the vacuum/air stream passing therethrough exceeding a preselected velocity and upon cessation of vacuum/air stream passage therethrough.

5. The method of claim 2 wherein closing the conduit is performed at a position between the receivers and the vacuum pump.

6. The method of claim 2 wherein closing the conduit occurs at the vacuum pump.

7. The method of claim 4 further comprising varying the voltage of the input current furnished to the pump.

8. A method for transporting granular resin material under vacuum via a single conduit from a supply of granular polymeric resin material to a plurality of receivers for the granular polymeric resin material for temporary storage of the granular polymeric resin material therein prior to molding or extrusion of the granular polymeric resin material into plastic parts, consisting of:
   a) actuating a vacuum pump to convey the granular polymeric resin material in a vacuum/air stream from the supply of granular polymeric resin material through a single conduit to the receivers, the conduit running between the supply of granular polymeric resin material and the receivers and extending from the receivers to the pump;
   b) providing a sensor in the conduit to sense at least one parameter of the vacuum/air stream flowing therethrough;
   c) varying speed of the pump thereby controlling speed of vacuum/air stream in the conduit by varying electrical current furnished to the pump in response to the sensed parameter; and
   d) limiting speed of the vacuum/air stream in the conduit to below a preselected level without varying speed of the pump, by
      i) positioning a tube concentrically in the conduit at the vacuum pump suction intake;
      ii) providing a pair of open-ended telescoping tubular segments within the tube, an outer tubular segment being fixed and the other being slideably axially movable along the fixed segment between a location remote from the plate and a location at which the axially moveable segment contacts the plate, precluding air flow through the tube, the location of the axially moveable segment is remote from the plate defining the preselected level;
      iii) providing a stationary plate extending partially across the interior of the tube and being fixedly connected thereto, for contacting and limiting travel of the moveable tubular segment, the plate covering an outlet end of the movable tubular segment upon contact therewith; and
      iv) providing a sail connected to the moveable segment, positioned in the tube upstream of the telescoping segments, for moving the movable segment in response to force of the vacuum/airstream impinging on the sail.

9. In a method for transporting granular polymeric resin material under vacuum via a single conduit from a supply of such granular polymeric resin material to a plurality of granular polymeric resin material receivers for temporary storage therein prior to molding or extrusion of the polymeric resin material into plastic parts including the steps of:
   a) actuating a vacuum pump to convey the granular polymeric resin material in a vacuum/air stream from the supply through a single conduit to the receivers, the conduit running between the supply and the receivers and extending from the receivers to the pump;
   b) providing a sensor in the conduit to sense at least one parameter of the vacuum/air stream flowing therethrough; and
   c) varying speed of the pump thereby controlling speed of vacuum/air stream in the conduit by varying electrical current furnished to the pump in response to the sensed parameter;
   the improvement comprising further limiting speed of the vacuum/air stream to below a preselected level by i) providing a tubular section of the conduit at the vacuum pump suction intake;

ii) providing co-axial telescoping tubular segments within the tubular section, connected to the tubular section in a manner precluding passage if air therebetween, and an fixed inner most segment being slideably axially movable respecting the outer segment;

iii) providing a plate extending across the interior of the tubular section, being fixedly connected thereto and positioned for contacting and limiting travel of the innermost tubular segment, the plate covering an outlet end of the movable tubular segment upon contact therewith; and iv) providing a sail connected to the innermost segment, positioned in the tubular section upstream of the telescoping segments;

thereby providing additional control of the speed of the vacuum/air stream in the conduit by regulating area between the plate and the innermost tubular segment available for passage therethrough of the vacuum/air stream.

10. The method of claim 9 wherein the improvement further comprises closing the conduit upon the vacuum/air stream passing therethrough exceeding a preselected velocity.

11. The method of claim 9 wherein the improvement further comprises closing the conduit upon cessation of vacuum/air stream passage therethrough.

12. The method of claim 9 wherein the improvement further comprises closing the conduit upon the vacuum/air stream passing therethrough exceeding a preselected velocity and upon cessation of vacuum/air stream passage therethrough.

13. The method of claim 10 wherein the improvement further comprises closing the conduit at a position between the receivers and the vacuum pump.

14. The method of claim 10 wherein the improvement further comprises closing the conduit at the vacuum pump.

15. The method of claim 11 wherein the improvement further comprises closing the conduit at a position between the receivers and the vacuum pump.

16. The method of claim 11 wherein the improvement further comprises closing the conduit at the vacuum pump.

17. The method of claim 12 wherein the improvement further comprises closing the conduit at a position between the receivers and the vacuum pump.

18. The method of claim 12 wherein the improvement further comprises closing the conduit at the vacuum pump.

19. In a method for transporting granular polymeric resin material under vacuum via a single conduit from a supply of such granular polymeric resin material to a plurality of granular polymeric resin material receivers for temporary storage therein prior to molding or extrusion of the polymeric resin material into plastic parts by performing the steps of:

a) actuating a vacuum pump to convey the granular polymeric resin material in a vacuum/air stream from the supply through a single conduit to the receivers, the conduit running between the supply and the receivers and extending from the receivers to the pump;

b) providing a sensor in the conduit to sense at least one parameter of the vacuum/air stream flowing therethrough; and c) varying speed of the pump thereby controlling speed of vacuum/air stream in the conduit by varying electrical current furnished to the pump in response to the sensed parameter;

the improvement consisting of further limiting speed of the vacuum/air stream to below a preselected level by i) providing a tubular section of the conduit at the vacuum pump suction intake;

ii) providing co-axial telescoping tubular segments within the tubular section, connected to the tubular section in a manner precluding passage if air therebetween, and an fixed inner most segment being slideably axially movable respecting the outer segment;

iii) providing a plate extending across the interior of the tubular section, being fixedly connected thereto and positioned for contacting and limiting travel of the innermost tubular segment, the plate covering an outlet end of the movable tubular segment upon contact therewith; and iv) providing a sail connected to the innermost segment, positioned in the tubular section upstream of the telescoping segments;

thereby providing additional control of the speed of the vacuum/air stream in the conduit by regulating area between the plate and the innermost tubular segment available for passage therethrough of the vacuum/air stream.

20. The method of claim 19 wherein the improvement further consists of closing the conduit upon the vacuum/air stream passing therethrough exceeding a preselected velocity.

21. The method of claim 19 wherein the improvement further consists of closing the conduit upon cessation of vacuum/air stream passage therethrough.

22. The method of claim 19 wherein the improvement further consists of closing the conduit upon the vacuum/air stream passing therethrough exceeding a preselected velocity and upon cessation of vacuum/air stream passage therethrough.

23. The method of claim 20 wherein the improvement further consists of closing the conduit at a position between the receivers and the vacuum pump.

24. The method of claim 20 wherein the improvement further consists of closing the conduit at the vacuum pump.

25. The method of claim 21 wherein the improvement further consists of closing the conduit at a position between the receivers and the vacuum pump.

26. The method of claim 21 wherein the improvement further consists of closing the conduit at the vacuum pump.

27. The method of claim 22 wherein the improvement further consists of closing the conduit at a position between the receivers and the vacuum pump.

28. The method of claim 22 wherein the improvement further consists of closing the conduit at the vacuum pump.

* * * * *